(12) United States Patent
Ihori et al.

(10) Patent No.: US 12,361,227 B2
(45) Date of Patent: Jul. 15, 2025

(54) SEQUENCE CONVERSION APPARATUS, MACHINE LEARNING APPARATUS, SEQUENCE CONVERSION METHOD, MACHINE LEARNING METHOD, AND PROGRAM

(71) Applicant: NIPPON TELEGRAPH AND TELEPHONE CORPORATION, Tokyo (JP)

(72) Inventors: Mana Ihori, Tokyo (JP); Ryo Masumura, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 249 days.

(21) Appl. No.: 17/799,588

(22) PCT Filed: Feb. 20, 2020

(86) PCT No.: PCT/JP2020/006728
§ 371 (c)(1),
(2) Date: Aug. 12, 2022

(87) PCT Pub. No.: WO2021/166145
PCT Pub. Date: Aug. 26, 2021

(65) Prior Publication Data
US 2023/0072015 A1    Mar. 9, 2023

(51) Int. Cl.
*G06F 40/40* (2020.01)

(52) U.S. Cl.
CPC .................... *G06F 40/40* (2020.01)

(58) Field of Classification Search
None
See application file for complete search history.

(56) References Cited

U.S. PATENT DOCUMENTS

| | | | |
|---|---|---|---|
| 2018/0300400 A1 | 10/2018 | Paulus | |
| 2021/0019479 A1* | 1/2021 | Tu | G06F 40/58 |

(Continued)

OTHER PUBLICATIONS

Yamagishi et al., Improving Context-aware Neural Machine Translation with Target-side Context, Sep. 2, 2019, arxiv: 1909.00531, pp. 1-12. (Year: 2019).*

(Continued)

*Primary Examiner* — Antim G Shah

(57) ABSTRACT

A device, to perform highly accurate sequence conversion consistent with the context, uses a t-th word string $X^t$ of the first text and a sequence $Y^{\wedge 1}, \ldots, Y^{\wedge t-1}$ of first to (t−1)-th word strings of the second text, which is a conversion result of a sequence $X^1, \ldots X^{t-1}$ of first to (t−1)-th word strings of the first text to obtain a probability of copying a word from the t-th word string $X^t$ or the sequence $Y^{\wedge 1}, \ldots, Y^{\wedge t-1}$, on the basis of the model parameters θ, and estimates information corresponding to a t-th word string $Y^t$ of the second text by copying a word from the t-th word string $X^t$ or the sequence $Y^{\wedge 1}, \ldots, Y^{\wedge t-1}$ based on the probability of copying.

12 Claims, 11 Drawing Sheets

SPOKEN WORD TEXT

| 0 | あのインターネットの解約はこちらの電話番号で (WELL, YOU WILL CANCEL THE INTERNET CONTRACT BY THIS PHONE NUMBER) | FILLER |
|---|---|---|
| 1 | 電話番号でよろしいですか (BY PHONE NUMBER, WON'T YOU?) | FILLED PAUSE SPANNING ACROSS BOUNDARY |
| 2 | でオプションも解約したいです ('N I WANT TO CANCEL THE OPTIONS, TOO) | CONNECTOR AT THE START OF THE SENTENCE |

WRITTEN WORD TEXT

| | RELATED ART | PRESENT INVENTION |
|---|---|---|
| 0 | インターネットの解約はこちらの電話番号で (YOU WILL CANCEL THE INTERNET CONTRACT BY THIS PHONE NUMBER) | インターネットの解約はこちらの電話番号で (YOU WILL CANCEL THE INTERNET CONTRACT BY THIS PHONE NUMBER) |
| 1 | 電話番号でよろしいですか (BY PHONE NUMBER, WON'T YOU?) | よろしいですか (, WON'T YOU?) |
| 2 | オプションも解約したいです (I WANT TO CANCEL THE OPTIONS, TOO) | そして、オプションも解約したいです (AND I WANT TO CANCEL THE OPTION, TOO) |

(56) References Cited

U.S. PATENT DOCUMENTS

2021/0110254 A1* 4/2021 Hoang ............... G06F 40/58
2021/0406483 A1   12/2021 Suzuki et al.

OTHER PUBLICATIONS

Yamagishi et al. (2019) "Contextual Neural Machine Translation with Consideration for Natural Language Intersentential Context" Proceedings of the 25th Annual Meeting of the Natural Language Processing Society, with English translation generated by computer.

Luong et al. (2015) "Effective Approaches to Attention-based Neural Machine Translation," in Proc. EMNLP, pp. 1412-1421.

See et al. (2017) "Get to the point: Summarization with pointer-generator networks," in Proc. Annual Meeting of the Association for Computational Linguistics (ACL), pp. 73-83.

Godfrey et al. (1992) "Switchboard: Telephone speech corpus for research and development," in Proc. ICASSP, pp. 517-520.

Ueffing et al. (20130 "Improved models for automatic punctuation prediction for spoken and written text," in Proc. Interspeech, pp. 3097-31.

Maekawa et al. (2000) "Spontaneous speech corpus of Japanese," in Proc. LREC, pp. 947-9520.

Maekawa et al. (2000) "Spontaneous speech corpus of Japanese," in Proc. International Conference on Language Resources and Evaluation (LREC) ACL Anthology, pp. 947-9520.

\* cited by examiner

SPOKEN WORD TEXT

| 0 | あのインターネットの解約はこちらの電話番号で (WELL, YOU WILL CANCEL THE INTERNET CONTRACT BY THIS PHONE NUMBER) | FILLER |
| --- | --- | --- |
| 1 | 電話番号でよろしいですか (BY PHONE NUMBER, WON'T YOU?) | FILLED PAUSE SPANNING ACROSS BOUNDARY |
| 2 | でオプションも解約したいです ('N I WANT TO CANCEL THE OPTIONS, TOO) | CONNECTOR AT THE START OF THE SENTENCE |

WRITTEN WORD TEXT

| | RELATED ART | PRESENT INVENTION |
| --- | --- | --- |
| 0 | インターネットの解約はこちらの電話番号で (YOU WILL CANCEL THE INTERNET CONTRACT BY THIS PHONE NUMBER) | インターネットの解約はこちらの電話番号で (YOU WILL CANCEL THE INTERNET CONTRACT BY THIS PHONE NUMBER) |
| 1 | 電話番号でよろしいですか (BY PHONE NUMBER, WON'T YOU?) | よろしいですか (, WON'T YOU?) |
| 2 | オプションも解約したいです (I WANT TO CANCEL THE OPTIONS, TOO) | そして、オプションも解約したいです (AND I WANT TO CANCEL THE OPTION, TOO) |

FIG. 8

| No | Manual transcriptions | | | | | | ASR transcriptions | | |
|---|---|---|---|---|---|---|---|---|---|
| | Accuracy (%) | | | Number of substitution errors | | | Accuracy (%) | | |
| | Test1 | Test2 | Test3 | Test1 | Test2 | Test3 | Test1 | Test2 | Test3 |
| 0 | 90.9 | 92.9 | 92.9 | -- | -- | -- | 84.8 | 84.4 | 87.9 |
| 1 | 98.3 | 98.0 | 97.5 | 114 | 120 | 183 | 92.0 | 92.3 | 92.3 |
| 2 | 98.7 | 98.6 | 98.0 | 24 | 13 | 21 | 92.2 | 93.9 | 92.8 |
| 3 | 99.1 | 98.5 | 98.1 | 57 | 88 | 26 | 92.6 | 93.9 | 92.8 |
| 4 | 99.2 | 99.1 | 98.7 | 4 | 9 | 14 | 92.7 | 94.3 | 93.0 |
| 5 | 99.4 | 99.2 | 99.8 | 6 | 3 | 3 | 92.9 | 94.4 | 93.4 |

FIG. 9

SEQUENCE CONVERSION APPARATUS, MACHINE LEARNING APPARATUS, SEQUENCE CONVERSION METHOD, MACHINE LEARNING METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/006728, filed on 20 Feb. 2020, the disclosure of which is hereby incorporated herein by reference in its entirety.

TECHNICAL FIELD

The present invention relates to sequence conversion technology for converting a text sequence to another text sequence.

BACKGROUND ART

With paraphrase generation technology that generates a sentence with an equivalent meaning to an input sentence, information other than the meaning can be controlled while keeping the meaning of the text. An example of paraphrase generation technology is spoken word to written word conversion that converts spoken word text, including fillers and filled pauses, from a speech recognition result to highly readable written text with these fillers and filled pauses removed. Such paraphrase conversion is considered to be a matter relating to translation within the same language (hereinafter, intralingual translation) and is regarded as a task relating to text generation from text, similar to machine translation and the like. In typical machine translation, the neural sequence conversion model using encoder-decoder networks which use the original text as the input and output the translated text has a high accuracy, and in intralingual translation, the neural sequence conversion model is becoming the predominant model.

The configuration of a known attention-based encoder-decoder network will be described next (see NPL 1, for example). Using spoken word to written word conversion as an example of same language translation where a word sequence of spoken word corresponding to the input is $X=(x_1, \ldots, x_N)$ and a word sequence of written word corresponding to the output is $Y=(y_1, \ldots, y_N)$, a posterior probability $P(Y|X, \theta)$ is modelled via known technology. Here, N is a positive integer representing the number of words included in the spoken word text, $x_1, \ldots, x_N$ is a sequence of words $x_i$ (i=1, ..., N) arranged in a time series, and $y_1, \ldots, y_N$ is a sequence of words (i=1, ..., N) arranged in a time series. $\theta$ represents a model parameter. The $P(Y|X, \theta)$ modeled via known technology is represented by the following Equation (1):

[Math. 1]

$$P(Y | X, \Theta) = \prod_{n=1}^{N} P(y_n | y_1, \ldots, y_{n-1}, X, \Theta) \quad (1)$$

For the specifics of the modeling, the method of NPL 1 can be used, for example.

CITATION LIST

Non Patent Literature

NPL 1: Thang Luong, Hieu Pham, and Christopher D. Manning, "Effective Approaches to Attention-based Neural Machine Translation," in Proc. EMNLP, pp. 1412-1421, 2015.

SUMMARY OF THE INVENTION

Technical Problem

The framework of the known technology described above is a result of modelling intralingual translation of single items of text, and when it is used to process a phrase composed of a continuous string of text, the text in the phrase are treated independently. Thus, the relationship between text is unable to be taken into account. That is, the information of how the prior text has been paraphrased may not be taken into account when paraphrasing the current text. As such, highly accurate intralingual translation consistent with the context is difficult to achieve. Herein, "text" is defined as a text sequence arranged in a time series. Such issues are not just found in cases of converting spoken word text sequences to written word text sequences, and are also found in cases of converting a text sequence to another text sequence.

In light of the foregoing, an object of the present invention is to perform highly accurate sequence conversion consistent with the context, with the sequence conversion processing a phrase composed of a sequence of a plurality of items of text.

Means for Solving the Problem

Information corresponding to a t-th word string $Y^t$ of a second text, which is a conversion result of a t-th word string $X^t$ of a first text is estimated on the basis of a model parameter $\theta$, by using, as inputs, a t-th word string $X^t$ of the first text and a sequence $Y^{\sim 1}, \ldots, Y^{\sim t-1}$ of first to (t-1)-th word strings of the second text, which is a conversion result of a sequence $X^1, \ldots X^{t-1}$ of first to (t-1)-th word strings of the first text. Here, t is an integer of two or greater.

Effects of the Invention

As described above, to obtain a posterior probability of a word string $Y^t$ of a t-th second text taking into account a sequence $Y^{\sim 1}, \ldots, Y^{\sim t-1}$ of word strings of a second text, the current text can be paraphrased taking into account information of how the previous text has been paraphrased, allowing a highly accurate sequence conversion consistent with the context to be achieved.

BRIEF DESCRIPTION OF DRAWINGS

FIG. 8 is a diagram illustrating written word text generated from spoken word text using a method according to embodiments.

FIG. 9 is a diagram illustrating results of an experiment.

DESCRIPTION OF EMBODIMENTS

Figure 1A:
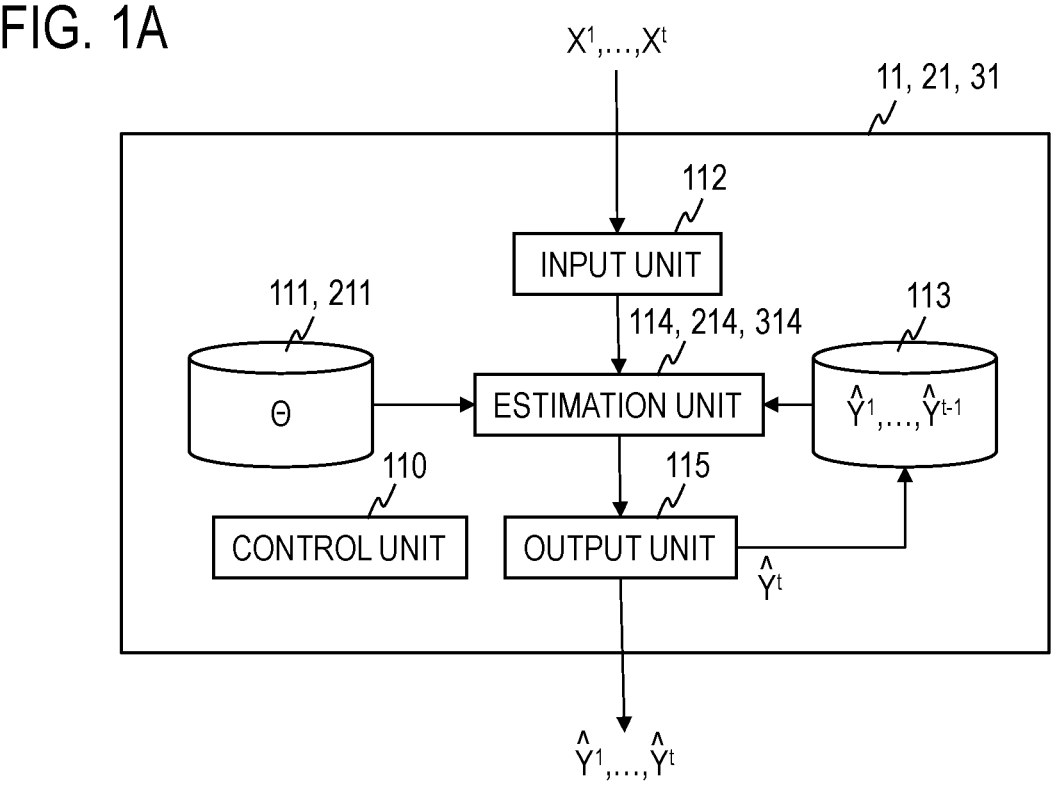
FIG. 1A is a block diagram illustrating functional configurations of sequence conversion devices according to embodiments.

Hereinafter, an embodiment of the present disclosure will be described with reference to the drawings.

Principle

First, the principle will be described. In embodiments, a neural sequence conversion model for sequence conversion (for example, intralingual translation) capable of handling text sequences, as opposed to single items of text as in known technology, is introduced. In this model, neural conversion including sequence conversion taking into account context can be achieved. That is, when paraphrasing an item of text in a text sequence, information from the beginning of the text sequence to the item of text one before the target text can be used as context. In a specific modeling, for example, Equation (1) is modified to Equation (2) below:

[Math. 2]

$$P(Y^t \mid \hat{Y}^1, \ldots, \hat{Y}^{t-1}, X^t, \Theta) = \prod_{n=1}^{N(t)} P(y_n^t \mid y_1^t, \ldots, y_{n-1}^t, \hat{Y}^1, \ldots, \hat{Y}^{t-1}, X^t, \Theta) \quad (2)$$

where $X^1, \ldots, X^T$ is a sequence of a word string $X^j = (x_1^j, \ldots, x_{M(j)}^j)$ (j=1, ..., T) of a first text, $x_i^j$ (i=1, ..., M(j)) is a word included in the word string $X^j$ of the first text, $Y^1, \ldots, Y^T$ is a sequence of a word string $Y^j = (y_1^j, \ldots, y_{N(j)}^j)$ (j=1, ..., T) of a second text, $y_r^j$ (i=1, ..., N(j)) is a word included in the word string $Y^j$ of the second text, and $Y^{\wedge j}$ (j=1, ..., T) is an estimated word string $Y^j$. Note that here it is assumed that the unit (one utterance) of the first text be generated by delineating 10 minutes of speech (this corresponding to 200 utterances) by each pause of 0.5 seconds, for example. However, the present invention is not limited thereto. Also, the superscript "^" of "$Y^{\wedge j}$" should be written directly above the "Y" (see Equation (2)), but due to the limitation of the description notation, it may be written in the upper right of "Y". T, N(j), and m(j) are positive integers, t satisfies t∈{1, ..., T}, and θ is a model parameter. For example, $x_i^j, \ldots, x_{M(j)}^j, y_1^j, \ldots, y_{N(j)}^j$ are arranged in time series, and $X^1, \ldots, X^T$ are also arranged in time series and $Y^1, \ldots, Y^T$ are also arranged in time series. An example of the first text is spoken word text, and an example of the second text is written word text. Equation (2) is different from Equation (1) in that the current word string $Y^t$ of the second text is estimated using the sequence $Y^{\wedge 1}, \ldots, Y^{\wedge t-1}$ of a previously generated word strings of the second text. In other words, information corresponding to the t-th word string $Y^t$ of the second text, i.e., the conversion result of the t-th word string $X^t$ of the first text is estimated on the basis of the model parameter θ by using, as inputs, the t-th word string $X^t$ of the first text and the sequence $Y^{\wedge 1}, \ldots, Y^{\wedge t-1}$ of the first to (t-1)-th word strings of the second text, i.e., the conversion result of the sequence $X^1, \ldots X^{t-1}$ of the first to (t-1)-th word strings of the first text. For example, information corresponding to the posterior probability $P(Y^t \mid Y^{\wedge 1}, \ldots, Y^{\wedge t-1}, X^t, \theta)$ of the t-th word string $Y^t$ of the second text obtained by rewriting the word string $X^t$ of the first text in the case where the model parameter θ and the word string $X^t$ of the first text, the sequence $Y^{\wedge 1}, \ldots, Y^{\wedge t-1}$ of word strings of the second text, and the model parameter θ are given, is obtained by using, as inputs, the t-th word string $X^t$ of the first text, the sequence $Y^{\wedge 1}, \ldots, Y^{\wedge t-1}$ of the first to (t-1)-th word strings of the second text obtained by rewriting the sequence $X^1, \ldots, X^{t-1}$ of the first to (t-1)-th word strings of the first text. Here, t is an integer of two or greater. Details will be described later.

As described above, in the case of paraphrasing each piece of text in a phrase composed of continuous string of text, a sequence conversion taking into account the relationship between the pieces of text is possible. That is, the information of how the previous text has been rewritten can be taken into account when paraphrasing the current text. Using spoken word to written word conversion as a specific example, in a case where speech composed of continuous utterances in a lecture, a telephone conversation, a meeting or the like is converted from spoken word text that is the result of speech recognition to written word text, the current spoken word text can be converted into written word text taking into account previous conversion information.

Note that the issue of information of how previous input text has been paraphrased not being able to be taken into account when paraphrasing the current input text may be able to be resolved by treating all of the pieces of text in the text sequence collectively as one long piece of text. However, because the current neural sequence conversion model has a framework whereby the entire text is converted and treated as a vector, there are issues such as poor performance with long pieces of text due to constraints including the number of words, calculation amount, and the like. In addition, with the neural sequence conversion model, it is intended that the pieces of text are sequentially paraphrased as each piece of text is input. But it is difficult to prepare all of the text in advance. The method of the present embodiment does not have these issues, and in the case of sequence conversion, a neural conversion that takes into account the context of previous paraphrase results (for example, written word text) can be achieved.

First Embodiment

Hereinafter, an embodiment will be described in detail. Hereinafter, an example of sequence conversion, spoken word to written word conversion, will be described in which a sequence of spoken word text is converted into a sequence of written word text. However, the present invention is not limited thereto.

Configuration

Figure 1B:
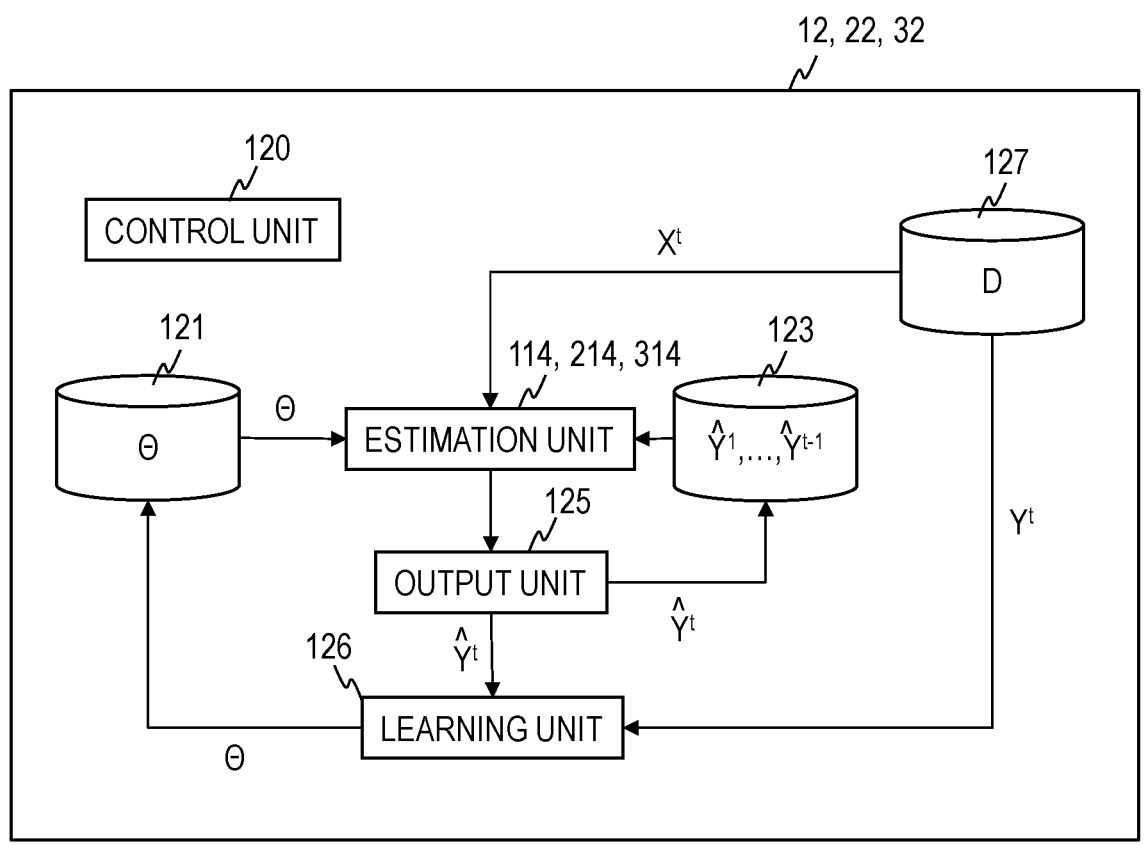
FIG. 1B is a block diagram illustrating functional configurations of machine learning devices according to embodiments.

As illustrated in FIG. 1A, a sequence conversion device 11 of a first embodiment includes a control unit 1, storage units 111, 113, an input unit 112, an estimation unit 114, and an output unit 115. The sequence conversion device 11 executes processing under the control of the control unit 1. As illustrated in FIG. 1B, a machine learning device 12 of the first embodiment includes a control unit 120, storage units 121, 123, 127, an estimation unit 114, an output unit 125, and a learning unit 126. The machine learning device 12 executes processing under the control of the control unit 120. For items already described, the same reference number may be given and description thereof may be omitted.

Sequence Conversion Processing

Next, intralingual translation processing, which is sequence conversion processing executed by the sequence conversion device 11 of the first embodiment, will be described.

Input: sequence $X^1, \ldots, X^t$ of t word strings of spoken word text (first text) of consecutive utterances model parameter $\theta$ Output: sequence $Y^{\wedge 1}, \ldots, Y^{\wedge t}$ of t word strings of consecutive written word text (second text)

The sequence conversion device 11 of the present embodiment uses, as an input, the sequence $X^1, \ldots, X^t$ of t word strings of spoken word text of consecutive utterances, obtains the sequence $Y^{\wedge 1}, \ldots, Y^{\wedge t}$ of t word strings of consecutive written word text via a probability calculation according to the model parameter $\theta$ and outputs this. Here, the sequence of t word strings of consecutive spoken word text input for the neural conversion is $X^1, \ldots, X^t$. Here, $X^j$ is the j-th word string of spoken word text and is represented by $X^j=(x_1^j, \ldots, x_{M(j)}^j)$ (j=1, ..., T). The sequence of word strings of written word text to be output is $Y^{\wedge 1}, \ldots, Y^{\wedge t}$. Here, $Y^{\wedge j}$ the estimated j-th word string of written word text and is represented by $Y^j=(y_1^j, \ldots, y_{N(j)}^j)$ (j=1, ..., T). Here, in the case of English, for example, a character string expression separated by a space may be a word string, and in the case of Japanese, for example, a character string expression automatically divided by morphological analysis or an expression separated by a character unit may be a word string. Furthermore, the model parameter $\theta$ is a collection of parameters for a plurality of units included in the estimation unit 114 of the sequence conversion device 11. The model parameter $\theta$ is obtained by machine learning executed by the machine learning device 12. The model used is not limited, and a known neural sequence conversion model can be used, for example. Specifically, the model described in NPL 1, which is cited in the background art, for example, can be used. However, because a plurality of words are common to both the input and output text in intralingual translation, it is more effective to use pointer-generator networks in which words in the input text can be copied. Thus, in the present embodiment, pointer-generator networks (see Reference Literature 1) are used in the model that acts a base.

Reference Literature 1: Abigail See, Peter J. Liu, and Christopher D. Manning, "Get to the point: Summarization with pointer-generator networks," in Proc. Annual Meeting of the Association for Computational Linguistics (ACL), 2017, pp. 73-83.

Figure 2:
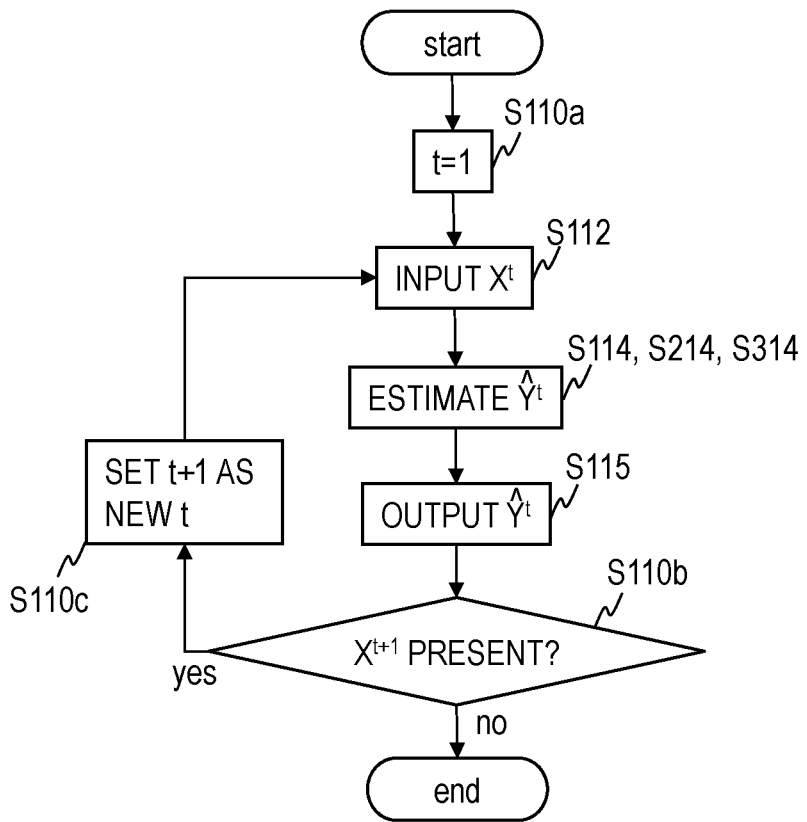
FIG. 2 is a flow chart illustrating sequence conversion processing according to embodiments.

Next, the flow of the intralingual translation processing of the first embodiment will be described using FIG. 1A and FIG. 2. For the translation processing, it is assumed that a learned model parameter $\theta$ be stored in the storage unit 111. The model parameter $\theta$ is obtained by the machine learning described below.

First, the control unit 1 initializes t to t=0 (step S1a).

The t-th word string $X^t$ of spoken word text of the sequence $X^1, \ldots, X^t$ of word strings of spoken word text is input to the input unit 112 (step S112).

The t-th word string $X^t$ of spoken word text is input to the estimation unit 114. The learned model parameter $\theta$ read from the storage unit 111 is also input to the estimation unit 114. As described further below, when t≥2, the sequence $Y^{\wedge 1}, \ldots, Y^{\wedge t-1}$ of the first to (t−1)-th word strings of written word text obtained by rewriting the sequence $X^1, \ldots, X^{t-1}$ of the first to (t−1)-th word strings of spoken word text is stored in the storage unit 113. The sequence $Y^{\wedge 1}, \ldots, Y^{\wedge t-1}$ of word strings of written word text is also read from the storage unit 113 and input to the estimation unit 114. When t=1, a sequence of word strings of written text is not stored in the storage unit 113, and a sequence of word strings of written word text is not input to the estimation unit 114. When the t-th word string $X^t$ of spoken word text, the sequence $Y^{\wedge 1}, \ldots, Y^{\wedge t-1}$ of the first to (t−1)-th word strings of written word text, and the model parameter $\theta$ are input, the estimation unit 114 obtains information corresponding to the posterior probability (posterior probability distribution) $P(Y^t|Y^{\wedge 1}, \ldots, Y^{\wedge t-1}, X^t, \theta)$ for the t-th word string of written word text by performing probability calculation according to the model parameter $\theta$, and determines and outputs the t-th word string $Y^{\wedge t}$ of written word text via maximum likelihood criterion. In the case of t=1, the estimation unit 114 obtains the posterior probability (posterior probability distribution) $P(Y^1|X^1, \theta)$ and determines and outputs the first word string $Y^{\wedge 1}$ of written word text via maximum likelihood criterion. In other words, the estimation unit 114 estimates information corresponding to the t-th word string $Y^t$ of written word text, i.e., the conversion result of the t-th word string $X^t$ of spoken word text on the basis of the model parameter $\theta$, by using, as inputs, the t-th word string $X^t$ of spoken word text (first text) and the sequence $Y^{\wedge 1}, \ldots, Y^{\wedge t-1}$ of the first to (t−1)-th word strings of written word text (second text), i.e., the conversion result of the sequence $X^1, \ldots X^{t-1}$ of the first to (t−1)-th word strings of spoken word text. More specifically, the estimation unit 114 uses, as inputs, for example, the t-th word string $X^t$ of spoken word text (first text), the sequence $Y^{\wedge 1}, \ldots, Y^{\wedge t-1}$ of the first to (t−1)-th word strings of written word text (second text) obtained by rewriting the sequence $X^1, \ldots, X^{t-1}$ of the first to (t−1)-th word strings of spoken word text, and the model parameter $\theta$, obtains information corresponding to the posterior probability $P(Y^t|Y^{\wedge 1}, \ldots, Y^{\wedge t-1}, X^t, \theta)$ of the t-th word string $Y^t$ of written word text obtained by rewriting the word string $X^t$ of spoken word text given the word string $X^t$ of spoken word text, the sequence $Y^{\wedge 1}, Y^{\wedge t-1}$ of word strings of written word text, and the model parameter $\theta$, obtains the t-th word string $Y^{\wedge t}$ of written word text via maximum likelihood criterion, and outputs this. Note that the determination via maximum likelihood criterion may be executed, for example, according to the following Equation (3):

[Math. 3]

$$\hat{Y}^t = \underset{Y^t}{\operatorname{argmax}}\left(Y^t \mid \hat{Y}^1, \ldots, \hat{Y}^{t-1}, X^t, \Theta\right) \qquad (3)$$

This processing can be executed recursively. That is, by setting, to be known information, the word string $Y^{\wedge t}$ of written word text, which is the conversion result of the t-th word string of spoken word text information corresponding to the posterior probability distribution $P(Y^{t+1}|Y^{\wedge 1}, \ldots, Y^{\wedge t}, X^{t+1}, \theta)$ for the (t+1)-th word string $Y^{\wedge t+1}$ of written word text. Furthermore, as in Equation (3), the word string $Y^{t+1}$ of written word text, which is the conversion result of the (t+1)-th word string of spoken word text, can be determined according to Equation (4).

[Math. 4]

$$\hat{Y}^{t+1} = \underset{Y^{t+1}}{\mathrm{argmax}} P\left(Y^{t+1} \mid \hat{Y}^1, \ldots, \hat{Y}^t, X^{t+1}, \Theta\right) \quad (4)$$

A detailed formulation and detailed calculation method of the information corresponding to $P(Y^t|Y^{\wedge 1}, \ldots, Y^{\wedge t-1}, X^t, \theta)$ is described below (step S114).

The obtained word string $Y^{\wedge t}$ of written word text is input to the output unit 115 and output from the output unit 115. The word string $Y^{\wedge t}$ of written word text is stored in the storage unit 113 (step S115).

The control unit 1 determines whether the next word string $X^{t+1}$ of spoken word text exists (step S1b). In a case where the next word string $X^{t+1}$ of spoken word text does not exist, the processing ends. On the other hand, in a case where the next word string $X^{t+1}$ of spoken word text exists, the control unit 1 sets t+1 as the newt, and the processing returns to step S112 (step S1c).

Machine Learning Processing

Machine learning processing by the machine learning device 12 of the first embodiment will now be described.

Input: training data $D=(A_1, B_1), \ldots, (A_{|D|}, B_{|D|})$, which is a set of multiple (one or more) couples of a sequence of word strings of spoken word text and a sequence of word strings of written word text Output: model parameter θ

The machine learning device 12 learns the model parameter θ from training data D, which is a set of multiple (one or more) couples of a sequence of word strings of spoken word text and a sequence of word strings of written word text obtained by rewriting the word strings of spoken word text. Note that $(A_m, B_m)$ is defined by $(A_m, B_m)$ $\{(Y^1, X^1), \ldots, (Y^{T(m)}, X^{T(m)})\}$, t(m) is a positive integer, m is defined by m=1, ..., |D|, and |D| is a positive integer representing the number of factors of the training data D. The model parameter θ^optimized by the training data D complies with the following Equation (5). Note that a typical optimization method used in training a neural network may be used for optimization.

[Math. 5]

$$\hat{\Theta} = \underset{\Theta}{\mathrm{argmax}} \prod_{m=1}^{|D|} \prod_{t=1}^{T} P(Y^t \mid Y^i, \ldots, Y^{t-1}, X^t, \Theta) \quad (5)$$

The learned model parameter θ^ is used as the model parameter θ.

Training Data D

The neural sequence conversion model requires large amounts of pairs of input data and output data to model the input and output relationships as an end-to-end model. Thus, to create a neural sequence conversion model for conversion from spoken word to written word, it is necessary to prepare large amounts of spoken word and written word language pairs. Various factors need to be taken into account in order to convert spoken word into written word. For example, filler, paraphrasing, removal of redundant expression, and the placement of punctuation marks need to be taken into account. It is thought that a more exhaustive list of factors taken into account can result in conversion into written word text with higher readability. However, studies in the related art have looked at these factors independently and used a corpus suitable for each factor (see Reference Literature 2 and 3, for example). Accordingly, with the corpuses in the related art, a conversion taking into account these factors at the same time has not been achieved.

Reference Literature 2: John J Godfrey, Edward C Holliman, and Jane McDaniel, "Switchboard: Telephone speech corpus for research and development," in Proc. ICASSP, pp. 517-520, 1992. Reference Literature 3: Nicola Ueffing, Maximilian Bisani, and Paul Vozila, "Improved models for automatic punctuation prediction for spoken and written text," in Proc. INTERSPEECH, pp. 3097-31, 2013.

Also, Japanese has distinctive expressions in both spoken word and written word. For example, in spoken word text, particles are often omitted, but in written word text particles are not omitted. In addition, in spoken word text, the literary style is not strictly kept uniform, but it is necessary to keep the literary style uniform in written word text to avoid confusing the reader. Thus, in the case of a Japanese phrase, distinctive factors of the Japanese language need to be taken into account in addition to the factors in the related art. For these reasons, the present embodiment aims at improving the readability of spoken word text, and uses, as the training data D, a corpus which is built to convert Japanese phrases from spoken word to written word taking into account both the factors in the related art and the factors distinctive to the Japanese language. For spoken word text, because it is thought that a more exhaustive list of factors taken into account can result in conversion into written word text with higher readability, the present corpus executes conversion using a plurality of factors at the same time. There are corpuses for Japanese spoken word (see Reference Literature 4, for example) that are for Japanese spoken word. However, in this corpus, annotation is only given for filler, filled pauses, and pauses of a certain length of time, and no factors specific to the Japanese language have been given consideration. As such, the present corpus is the first corpus capable of taking into account a plurality of factors relating to Japanese spoken word to written word conversion at the same time.

Reference Literature 4: Kikuo Maekawa, Hanae Koiso, Sadaoki Furui, and Hitoshi Isahara, "Spontaneous speech corpus of Japanese," in Proc. LREC, pp. 947-9520, 2000.

Hereinafter, the rules for executing Japanese spoken word to written word conversion manually when creating a corpus will be described in detail. In spoken word to written word conversion, it is necessary to convert spoken word text including filler and paraphrases obtained from speech recognition results into written word text with high readability. Specifically, we will focus on factors responsible for reducing the readability of spoken word text and convert those factors into written word. Examples are given below. (1) to (3) are Japanese distinctive rules, and (4) describe below is a common rule.

(1) Unified Style

Literary styles in the Japanese language include a normal form in which "da", "dearu", and the like are used at the ending of words and a polite form in which "desu", "masu", and the like are used at the ending of words. Note that the plain form is typically used in written word.

However, because speech recognition is a record of utterances, a phrase obtained by making all of the word endings "da" or "dearu" will be unnatural. Thus, in the case of a Japanese phrase, as the literary style of written word text, we shall use the polite form which can be used for both spoken word and written word.

(2) Restoration of Particles

In Japanese spoken word, the particles are often omitted. However, because the particle function to indicate the semantic relationship between nouns, verbs, and adjectives, it is not possible to omit the particles in written word if the intention is to correctly convey the meaning of the phrase. Thus, in the case of a Japanese phrase, the particles omitted from the spoken word text shall be restored in the spoken word to written word conversion.

(3) Unified Kana and Kanji Notation

Because spoken word text is a record of utterances obtained by speech recognition, there can be some inconsistencies in the notation. For example, numbers maybe converted to kanji numbers, and English notation may be converted to hiragana notation. Thus, with spoken word to written word conversion, English, number notation, and hiragana notation that reduce the readability of spoken word text shall be corrected.

(4) Punctuation Placement

In speech recognition, a punctuation mark may be placed at a pause of a certain length of time. However, these are not added to improvement in readability and may contain omissions and errors. As such, after conjunctions (soshite, shikashi, mata, tsumari, and the like) in spoken word text or if there is a string of Kanji or hiragana, a comma is placed in the written word text to increase readability, and if there is an error in the placement of punctuation marks in the spoken word text, this shall be corrected in the spoken word to written word conversion.

(5) Removal of Filled Pause Expressions

Phrases with filler and filled pauses have a low readability, and so these shall be removed in the spoken word to written word conversion.

(6) Deletion of Redundant Expressions and Phrase Simplification

With spoken word, because it is a record of utterances said as they come to mind, there are redundant phrases and grammatically incorrect phrases. Thus, if the same expression is repeated in spoken word text, in the spoken word to written word conversion, the unnecessary expressions shall be deleted or the phrases shall be split up to correct them into phrases with good readability.

(7) Correction of Speech Recognition Error

Because recognition errors often occur in speech recognition, words that are recognized as errors from the context shall be corrected in the spoken word to written word conversion.

It is thought that a more exhaustive list of factors taken into account can result in conversion into written word text with higher readability. Examples of these factors taken into account in the spoken word to written word conversion are given below.

Spoken Word Text
  Yeah, yeah, you're right.
  Well I exercise lots and eat pretty conservatively, so I don't really see the need for me to go on a diet.
  Metabolic syndrome and all that hasn't really affected me, but I try to not get diabetes.

Written Word Text
  You're right.
  I exercise a lot and eat conservatively. Thus, there is no need for a diet. Metabolic syndrome has not affected me, but I try not to get diabetes.

Flow of Machine Learning Processing

Figure 3:
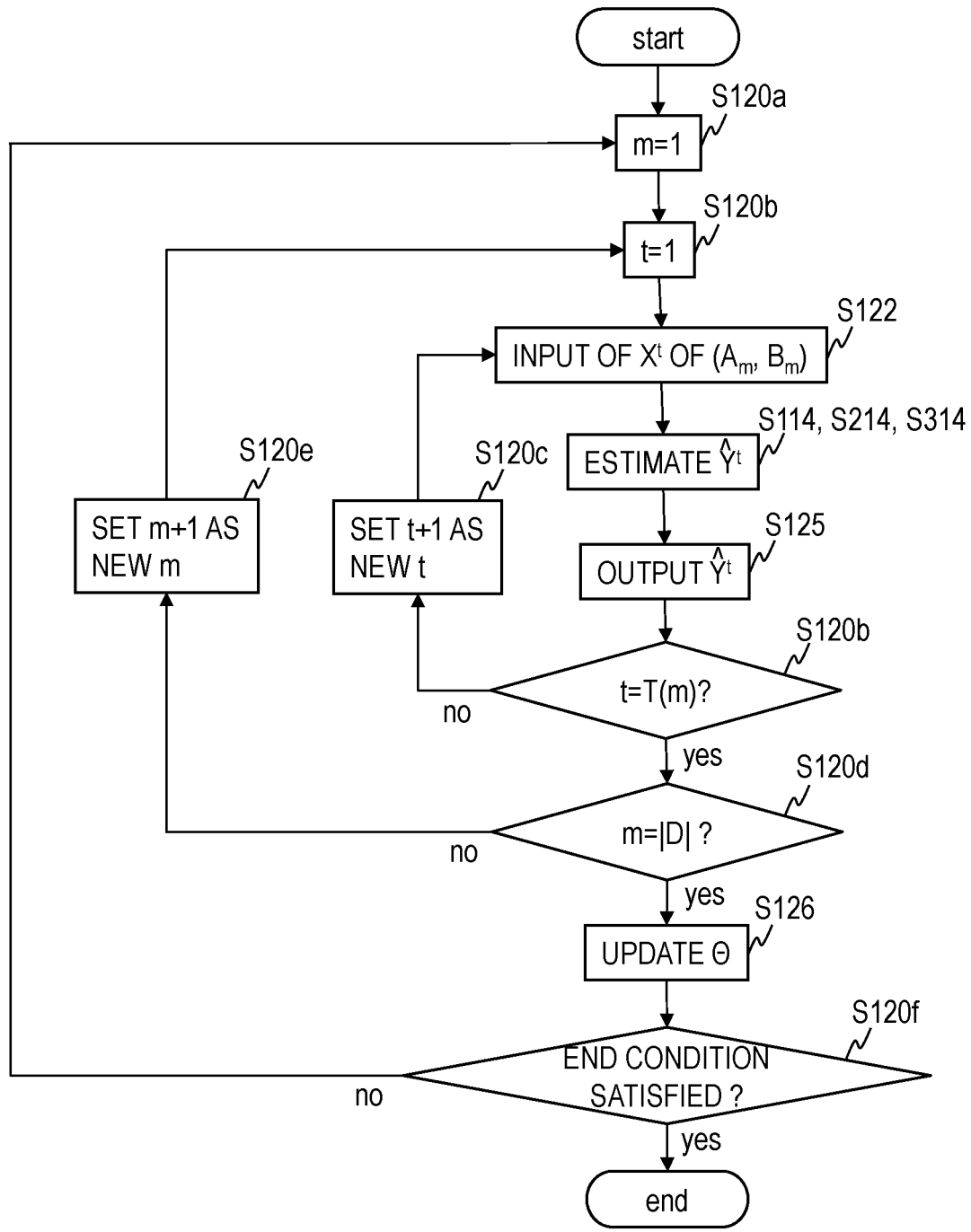
FIG. 3 is a flow chart illustrating machine learning processing according to embodiments.

Next, an example of the machine learning processing flow of the present embodiment will be described using FIGS. 1B and 3. The machine learning device 12 learns the model parameter $\theta$ using the training data $D=(A_1, B_1), \ldots, (A_{|D|}, B_{|D|})$ as follows, for example.

First, the control unit 120 of the machine learning device 12 (FIG. 1B) initializes m to m=1 (step S120a).

Also, the control unit 120 initializes t to t=1 (step S120b).

The word string $X^t$ of spoken word text of $(A_m, B_m) = \{(Y^1, X^1), \ldots, (Y^{T(m)}, X^{T(m)})\}$ of the training data D is read from the storage unit 127 and input to the estimation unit 114 (step S122). The learned model parameter $\theta$ read from the storage unit 121 is also input to the estimation unit 114. When $t \geq 2$, the sequence $Y^{\wedge 1}, \ldots, Y^{\wedge t-1}$ of the first to (t-1)-th word strings of written word text obtained by rewriting the sequence $X^1, \ldots, X^{t-1}$ of the first to (t-1)-th word strings of spoken word text is stored in the storage unit 123. The sequence $Y^{\wedge 1}, \ldots, Y^{\wedge t-1}$ of word strings of written word text is also read from the storage unit 123 and input to the estimation unit 114. When t=1, a sequence of word strings of written text is not stored in the storage unit 123, and a sequence of word strings of written word text is not input to the estimation unit 114. When the t-th word string $X^t$ of spoken word text, the sequence $Y^{\wedge 1}, \ldots, Y^{\wedge t-1}$ of the first to (t-1)-th word strings of written word text, and the model parameter $\theta$ are input, the estimation unit 114 obtains information corresponding to the posterior probability (posterior probability distribution) $P(Y^t|Y^{\wedge 1}, \ldots, Y^{\wedge t-1}, X^t, \theta)$ for the t-th word string of written word text by performing probability calculation according to the model parameter $\theta$, and determines and outputs the t-th word string $Y^{\wedge t}$ of written word text via maximum likelihood criterion. In the case of t=1, the estimation unit 114 obtains the posterior probability (posterior probability distribution) $P(Y^1|X^1, \theta)$ and determines and outputs the first word string $Y^{\wedge 1}$ of written word text via maximum likelihood criterion (step S114).

The obtained word string $Y^{\wedge t}$ of written word text is input to the output unit 125 and output from the output unit 125. The word string $Y^{\wedge t}$ of written word text is input to the learning unit 126 and is stored in the storage unit 123. The word string $Y^{\wedge t}$ of written word text is input to the learning unit 126. Also, the training data D read from the storage unit 127 is input to the learning unit 126 (step S125).

The control unit 120 determines whether or not t satisfies t=T(m) (step S120b). In a case where t does not satisfy t=T(m), the control unit 120 sets t+1 as the new t, and the processing returns to step S122 (step S120c). In a case where t satisfies t=T(m), the control unit 120 determines whether or not satisfies m=|D| (step S120d). In a case where m does not satisfy m=|D|, the control unit 120 sets m+1 as the new m, and the processing returns to step S120b (step S120e). In a case where m satisfies m=ID1, the learning unit 126 updates the model parameter $\theta$ in accordance with Equation (5) described above. To update the model parameter $\theta$, a known method such as a backpropagation method is used (step S126).

When the model parameter $\theta$ is updated, the control unit 120 determines whether the end condition has been satisfied. Examples of the end condition include the model parameter $\theta$ having been updated a predetermined number of times, the updated amount of the model parameter $\theta$ being equal to or less than a predetermined value, and the like. Here, in a case where the end condition is not satisfied, the control unit 120 returns the processing to step S120a. On the other hand, in a case where the end condition is satisfied, the processing ends. In other words, under the condition that t is an integer of 2 or greater, $X^i$ is a word string of spoken word text (first text), and $Y^i$ is a word string of written word text (second text) obtained by rewriting $X^i$, the learning unit 126 executes machine learning with the sequence of couples of a word string $A^i$ of written word text (second text) and a word string $B^i$ of spoken word text (first text) as the training data, and uses, as inputs, the t-th word string $X^t$ of spoken word text (first text), the sequence $Y^{\wedge 1}, \ldots, Y^{\wedge t-1}$ of the first to (t−1)-th word strings of written word text (second text) obtained by rewriting the sequence $X^1, \ldots, X^{t-1}$ of the first to (t−1)-th word strings of spoken word text, and obtains and outputs the model parameter θ of a model for obtaining information corresponding to the posterior probability $P(Y^t|Y^{\wedge 1}, \ldots, Y^{\wedge t-1}, X^t, \theta)$ of the t-th word string $Y^t$ of written word text (second text) in the case where the model parameter θ, and the word string $X^t$ of spoken word text (first text), the sequence $Y^{\wedge 1}, \ldots, Y^{\wedge t-1}$ of a word string of written word text (second text), and the model parameter θ are given (step S120*f*).

Details of Estimation Unit 114

Figure 4:
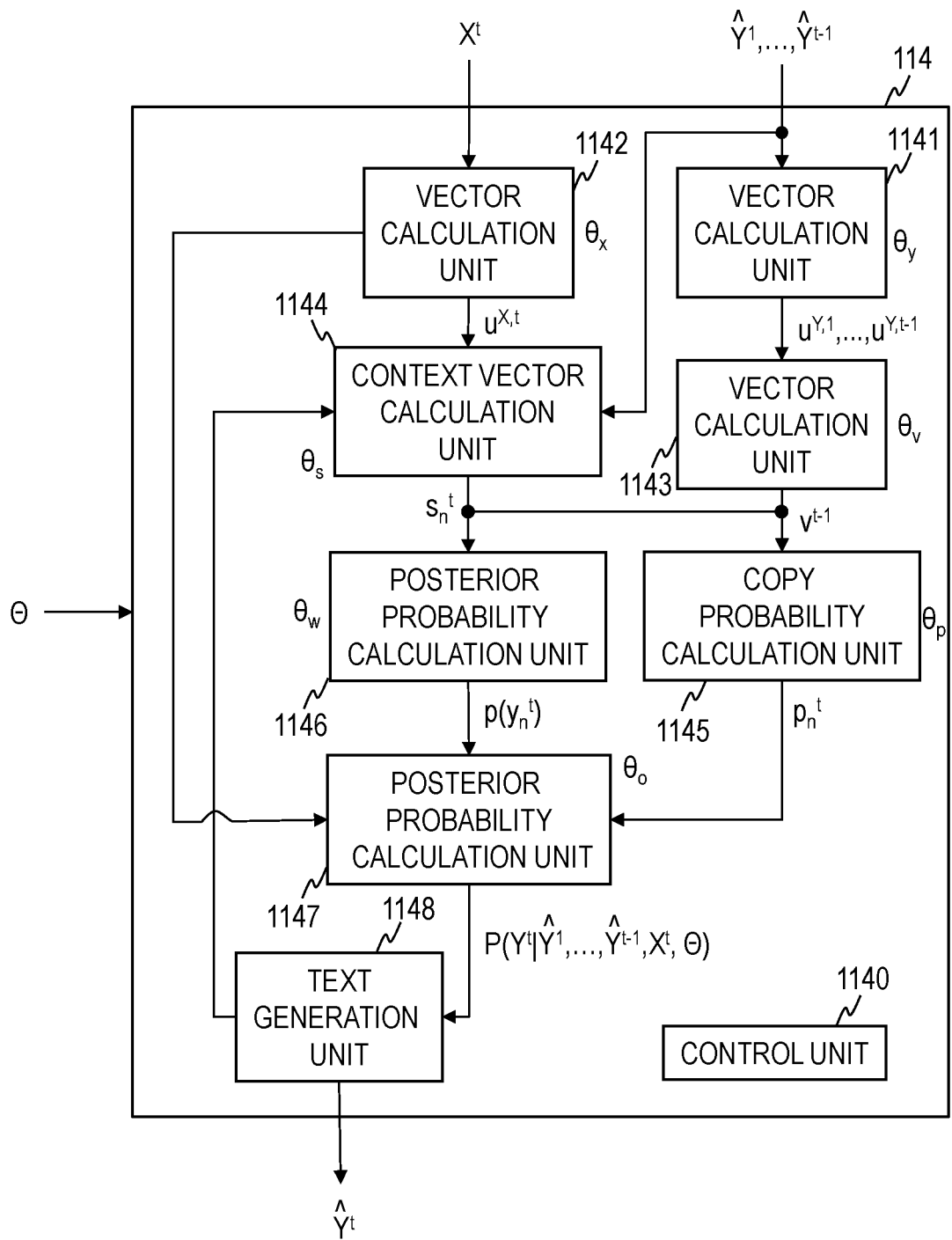
FIG. 4 is a block diagram illustrating a functional configuration of an estimation unit according to a first embodiment.

Details of the estimation unit 114 will now be described. As illustrated in FIG. 4, the estimation unit 114 includes a control unit 1140, vector calculation units 1141, 1142, 1143, a context vector calculation unit 1144, a copy probability calculation unit 1145, posterior probability calculation units 1146, 1147, and a text generation unit 1148. The estimation unit 114 executes processing under the control of the control unit 1140.

As described above, the estimation unit 114 calculates information corresponding to the posterior probability $P(Y^t|Y^{\wedge 1}, \ldots, Y^{\wedge t-1}, X^t, \theta)$. Below, an example of processing by the estimation unit 114 to calculate the posterior probability $P(y_n^t|y_1^t, \ldots, y_{n-1}^t, Y^{\wedge 1}, \ldots, Y^{\wedge 1}, \ldots, Y^{\wedge t-1}, X^t, \theta)$ for the n-th word $y_n^t$ of the t-th word string $Y^{\wedge t}$ of written word text. Note that n is a positive integer, and in a case where n=1, the posterior probability $P(y_n^t|Y^{\wedge 1}, \ldots, Y^{\wedge t-1}, X^t, \theta)$ is calculated. Here, the model parameter θ includes model parameters $\theta_y, \theta_x, \theta_s, \theta_v, \theta_p, \theta_2, \theta_o$, and is represented as $\theta=\{\theta_y, \theta_x, \theta_s, \theta_v, \theta_p, \theta_w, \theta_o\}$.

Processing by Vector Calculation Unit 1141 (First Vector Calculation Unit)

Input: (t−1)-th word string $Y^{\wedge t-1}$ of written word text
model parameter $\theta_y$
Output: text vector $u^{Y, t-1}$ for the (t−1)-th word string of written word text The vector calculation unit 1141 converts the (t−1)-th word string $Y^{\wedge t-1}$ of written word text to the (t−1)-th text vector $u^{Y, t-1}$ of written word text by a conversion function based on the model parameter $\theta_y$. At this time, the (t−1)-th word string $Y^{\wedge t-1}$ of written word text includes one or more words. The text vector $u^{Y, t-1}$ represents a vector embedded with information included in the word string $Y^{\wedge t-1}$ and includes semantic information of the text considered to be required to convert the next spoken word text to written word. The greater the number of dimensions of the vector, the more information can be embedded, and, for example, a 512-dimensional vector is set as the text vector $u^{Y, t-1}$. The number of dimensions of the vector can be manually set. Any function that can convert an input symbol string of a variable length to a single vector can be used as the conversion function based on the model parameter $\theta_y$. For example, a function that outputs a frequency vector of words in the input text, a recurrent neural network, a two-way recurrent neural network, or the like can be used as the conversion function. Note that in a case of t=1, since there is no word string $Y^{\wedge 0}$ to be input, the output $u^{Y, 0}$ for $Y^{\wedge 0}$ is a vector in which all of the factors are 0.0. Also, the vector calculation unit 1141 executes processing of each of the word strings $Y^{\wedge i}$ for $\{Y^{\wedge 1}, \ldots, Y^{\wedge t-1}\}$ (where, i=1, . . . , t−1). Thus, the vector calculation unit 1141 outputs the text vector $u^{Y, i}$ of $\{u^{Y, 1}, \ldots, u^{Y, t-1}\}$ for each input of the word string $Y^{\wedge i}$ (where i=1, . . . , t−1) of $\{Y^{\wedge 1}, \ldots, Y^{\wedge t-1}\}$. That is, the vector calculation unit 1141 (the first vector calculation unit) executes conversion based on the model parameter $\theta_y$ on the sequence $Y^{\wedge 1}, \ldots, Y^{\wedge t-1}$ of the word strings of written word text (second text) to obtain and output the sequence $u^{Y, 1}, \ldots, u^{Y, t-1}$ of the text vector of the word string $Y^{\wedge 1}$ of written word text (second text) for i=1, . . . , t−1.

Processing by Vector Calculation Unit 1142 (Second Vector Calculation Unit)

Input: the t-th word string $X^t$ of spoken word text
model parameter $\theta_x$
Output: text vector $u^{X, t}$ for the t-th word string $X^t$ of spoken word text The vector calculation unit 1142 converts the t-th word string $X^t$ of spoken word text to the t-th text vector $u^{X, t}$ of spoken word text by a conversion function based on the model parameter $\theta_x$. A specific example of the conversion function based on the model parameter $\theta_x$ is the same as the conversion function based on the model parameter $\theta_y$, except that $\theta_y$ is replaced with $\theta_x$, and thus a detailed description thereof will be omitted. That is, the vector calculation unit 1142 (second vector calculation unit) executes conversion based on the model parameter $\theta_x$ on the word string $X^t$ of spoken word text (first text) to obtain and output the text vector $u^{X, t}$ of the word string $X^t$ of spoken word text (first text).

Vector Calculation Unit 1143 (Third Vector Calculation Unit)

Input: sequence $u^{Y, 1}, \ldots, u^{Y, t-1}$ of the text vector $u^{Y, i}$ for previous word strings of spoken word text
model parameter $\theta_v$
Output: the (t−1)-th written word text sequence embedded vector $v^{t-1}$ The vector calculation unit 1143 converts the sequence $u^{Y, 1}, \ldots, u^{Y, t-1}$ of the text vector $u^{Y, i}$ for a previous written word text sequence to the (t−1)-th written word text sequence embedded vector $v^{t-1}$ by a conversion function based on the model parameter $\theta_v$. The written word text sequence embedded vector $v^{t-1}$ is a single vector, and the semantic information required to convert the next word string $X^t$ of spoken word text to the word string $Y^{\wedge t}$ of written word text. The greater the number of dimensions of the vector, the more information can be embedded, and, for example, a 512-dimensional vector is set as the written word text sequence embedded vector $v^{t-1}$. The number of dimensions of the vector can be manually set. Any function that can convert an vector string of a variable length to a single vector can be used as the conversion function based on the model parameter $\theta_v$, and, for example, a recurrent neural network, a function that averages the vectors of a text vector sequence, and the like may be used. Note that the number of dimensions of the text sequence embedded vector $v^{t-1}$ in the case of averaging depends on the number of dimensions of the sequence $u^{Y, 1}, \ldots, u^{Y, t-1}$ of the text vector $u^{Y, i}$. Note that, in the case of t=1, since there is no text vector sequence for the previous word strings of spoken word text, the written word text sequence embedded vector $v^0$ output by the vector calculation unit 1143 is a vector in which all of the factors are 0.0. In other words, the vector calculation unit 1143 (third vector calculation unit) executes conversion based on the model parameter $\theta_v$ on the sequence $u^{Y, 1}, \ldots, u^{Y, t-1}$ to obtain and output the (t−1)-th written word text sequence embedded vector (second text sequence embedded vector) $v^{t-1}$.

Context Vector Calculation Unit 1144

Input: word string $y_1^t, \ldots, y_{n-1}^t$ previous to the n-th word $y_n^t$ in the t-th word string $Y^{\sim t}$ of written word text text vector $u^{X, t}$ for the t-th word string $X^t$ of spoken word text model parameter $\theta_s$ Output: context vector $s_n^t$ for the n-th word in the t-th word string $Y^{\sim t}$ of written word text taking into account the t-th word string $X^t$ of spoken word text The context vector calculation unit 1144 converts the word string $y_1^t, \ldots, y_{n-1}^t$ previous to the n-th word $y_n^t$ in the t-th word string $Y^{\sim t}$ of written word text and the text vector $u^{X, t}$ for the t-th word string $X^t$ of spoken word text to the context vector $s_n^t$ for the n-th word in the t-th word string $Y^{\sim t}$ of written word text taking into account the t-th word string $X^t$ of spoken word text using a conversion function based on the model parameter $\theta_s$. Note that in a case of n=1, because there is no previous word string $y_1^t, \ldots, y_{n-1}^t$, a predetermined value (for example, a zero vector) is used instead of the previous word string $y_1^t, \ldots, y_{n-1}^t$. The context vector $s_n^t$ is embedded with semantic information necessary for the written word to spoken word conversion of the following word. Any function that can convert two types of vector strings of variable length to a single vector can be used as the conversion function here. An example of this conversion function is a function (see NPL 1, for example) that applies a recurrent neural network and an attention mechanism to the word string $y_1^t, \ldots, y_{n-1}^t$ of written word text and the text vector $u^{X, t}$ for the word string $X^t$ of spoken word text to output a single context vector. An alternative, simpler example of the conversion function is a function that outputs a vector obtained by averaging the frequency vectors of the text vector $u^{X, t}$ for the t-th word string $X^t$ of spoken word text and the word string $y_1^t, \ldots, y_{n-1}^t$ previous to the n-th word $y_n^t$ of the t-th word string $Y^{\sim t}$ of written word text. In other words, under the condition that n is an integer of 2 or greater and equal to or less than the number of words included in the t-th word string $Y^{\sim t}$ of written word text (second text), the context vector calculation unit 1144 executes conversion based on the model parameter $\theta_s$ on the text vector $u^{X, t}$ and the word string $y_1^t, \ldots, y_{n-1}^t$ previous to the n-th word $y_n^t$ included in the word string $Y^{\sim t}$ of written word text (second text) to obtain and output the context vector $s_n^t$ for the n-th word in the t-th word string $Y^{\sim t}$ of written word text (second text) taking into account the word string $X^t$ of spoken word text (first text).

Copy Probability Calculation Unit 1145

Input: the (t−1)-th written word text sequence embedded vector $v^{t-1}$ context vector $s_n^t$ for the n-th word in the t-th word string $Y^{\sim t}$ of written word text model parameter $\theta_p$ Output: copy probability $p_n^t$ for the n-th word in the t-th word string $Y^{\sim t}$ of the written word text The copy probability calculation unit 1145 converts the t-th written word text sequence embedded vector $v^{t-1}$, and the context vector $s_n^t$ for the n-th word in the t-th word string $Y^{\sim t}$ of written word text to the copy probability $p_n^t$ for the n-th word of the t-th word string $Y^{\sim t}$ of written word text by the conversion function based on the model parameter $\theta_p$. This probability is a probability for determining how many words to be copied from the word string $X^t$ of spoken word text when the n-th word in the t-th word string $Y^{\sim t}$ of written word text is output. Any function that can convert and output two types of input vectors to a scalar value of 0 or greater and 1 or less can be used as the conversion function here. An example of the conversion function is a function for performing conversion on a combined vector of two input vectors using a sigmoidal function. In other words, the copy probability calculation unit 1145 executes conversion based on the model parameter $\theta_p$ on the written word text sequence embedded vector (second text sequence embedded vector) $v^{t-1}$ and the context vector $s_n^t$ to obtain and output the copy probability $p_n^t$ for the n-th word of the t-th word string $Y^{\sim t}$ of written word text.

Posterior Probability Calculation Unit 1146 (First Posterior Probability Calculation Unit)

Input: the (t−1)-th written word text sequence embedded vector $v^{t-1}$ context vector $s_n^t$ for the n-th word in the t-th word string $Y^{\sim t}$ of written word text model parameter $\theta_w$ Output: posterior probability $P(y_n^t)$ for n-th word in the t-th word string of written word text The posterior probability calculation unit 1146 obtains and outputs the t-th written word text sequence embedded vector $v^{t-1}$, and the context vector $s_n^t$ for the n-th word in the t-th word string $Y^{\sim t}$ of written word text to the posterior probability $P(y_n^t)$ for the n-th word of the t-th word string of written word text by the conversion function based on the model parameter $\theta_w$. The posterior probability can be expressed as a vector with the probability of each word as an factor and can be expressed as a posterior probability distribution by vector conversion of each factor to a vector. Any function that can convert and output two types of vectors to a posterior probability distribution can be used as the conversion function here. An example of the conversion function is a function for performing conversion on a combined vector of two input vectors using a softmax function. In other examples, the conversion function may be a function in which a sum of factors of an output vector corresponding to a posterior probability distribution can be converted to 1.0. In other words, the posterior probability calculation unit 1146 (first posterior probability calculation unit) executes conversion based on the model parameter $\theta_w$ on the written word text sequence embedded vector (second text sequence embedded vector) $v^{t-1}$ and the context vector $s_n^t$ to obtain and output the posterior probability $P(y_n^t)$ for the word $y_n^t$.

Posterior Probability Calculation Unit 1147 (Second Posterior Probability Calculation Unit)

Input: posterior probability $P(y_n^t)$ for the n-th word in the t-th word string $Y^{\sim t}$ of written word text t-th word string $X^t$ of spoken word text copy probability $p_n^t$ for the n-th word in the t-th word string $Y^{\sim t}$ of written word text model parameter $\theta_o$ Output: posterior probability for the n-th word $y_n^t$ of t-th word string of written word text $$P(y_n^t | y_1^t, \ldots, y_{n-1}^t, Y^{\sim 1}, \ldots, Y^{\sim t-1}, X^t, \theta)$$

The posterior probability calculation unit 1147 applies a conversion function based on the model parameter N on the posterior probability $P(y_n^t)$ for the n-th word in the t-th word string $Y^{\sim t}$ of written word text, the t-th word string $X^t$ of spoken word text, and the copy probability $p_n^t$ for the n-th word in the t-th word string $Y^{\sim t}$ of written word text, to obtain and output the posterior probability $P(y_n^t | y_1^t, \ldots, y_{n-1}^t, Y^{\sim 1}, \ldots, Y^{\sim t-1}, X^t, \theta)$ for the n-th word of the t-th word string of written word text. An example of the conversion function used here is the sum of the copy probability $p_n^t$ multiplied by the posterior probability $P(y_n^t)$ and a value of 1 minus the copy probability $p_n^t$ multiplied by the distribution of words obtained from the t-th word string $X^t$ of spoken word text. As the method for obtaining the distribution of words from the word string $X^t$, a method for obtaining any distribution from the vector in the word sequence $X^t$ can be used. In a simplier example, the result of a conversion to frequency vectors of the word string $X^t$ using a softmax function can be used as the word distribution. In other words, the posterior probability calculation unit 1147 (second posterior probability calculation unit) executes conversion based on the model parameter $\theta_o$ on the word string $X^t$ of spoken word text (first text), the posterior probability $P(y_n^t)$, and the copy probability $p_n^t$, to obtain and output the posterior probability $P(y_n^t|y_1^t, \ldots, y_{n-1}^t, Y^{\wedge 1}, \ldots, Y^{\wedge t-1}, X^t, \theta)$ corresponding to the posterior probability $P(Y^t|Y^{\wedge 1}, \ldots, Y^{\wedge t-1}, X^t, \theta)$.

Text Generation Unit 1148

Input: posterior probability of the first n words $y_1^t, \ldots, y_n^t$ of the t-th word string $Y^{\wedge t}$ of written word text $P(y_1^t|Y^{\wedge 1}, \ldots, Y^{\wedge t-1}, X^t, \theta), \ldots, P(y_n^{t-1}|y_1^t, \ldots, y_{n-1}^t, Y^{\wedge 1}, \ldots, Y^{\wedge t-1}, x^t, \theta)$ Output: the t-th word string $Y^{\wedge t}$ of written word text The text generation unit 1148 selects for each one of $n=1, \ldots, N(t)$ the word $y_n^t$ such that the product of the posterior probability $P(y_1^t|Y^{\wedge 1}, \ldots, Y^{\wedge t-1}, x^t, \theta), \ldots, P(y_n^t|y_1^t, \ldots, y_{n-1}^t, Y^{\wedge 1}, \ldots, Y^{\wedge t-1}, X^t, \theta)$ for the first n words $y_1^t, \ldots, y_n^t$ of the t-th word string $Y^{\wedge t}$ of written word text is the maximum to obtain and output the t-th word string $Y^{\wedge t}=(y_1^t, \ldots, y_{N(t)}^t)$ of written word text. At this time, any method able to obtain a maximum product of the posterior probability $P(y_1^t|Y^{\wedge 1}, \ldots, Y^{\wedge t-1}, X^t, \theta), \ldots, P(y_n^t|y_1^t, \ldots, y_{n-1}^t, Y^{\wedge 1}, \ldots, Y^{\wedge t-1}, X^t, \theta)$ can be used to select the factor for $y_1^t, \ldots, y_{N(t)}^t$. For example, as the method, an approximation algorithm, such as a greedy algorithm, can be used.

The processing is recursively repeated until all words in the word string $Y^{\wedge t}(t=1, \ldots, T)$ T) of written word text are generated and the word string $X^t$ ($t=1, \ldots, T$) of spoken word text of interest is all converted to word string $Y^{\wedge t}$ of written word text. The flow of the processing is illustrated in FIG. 5.

Figure 5:
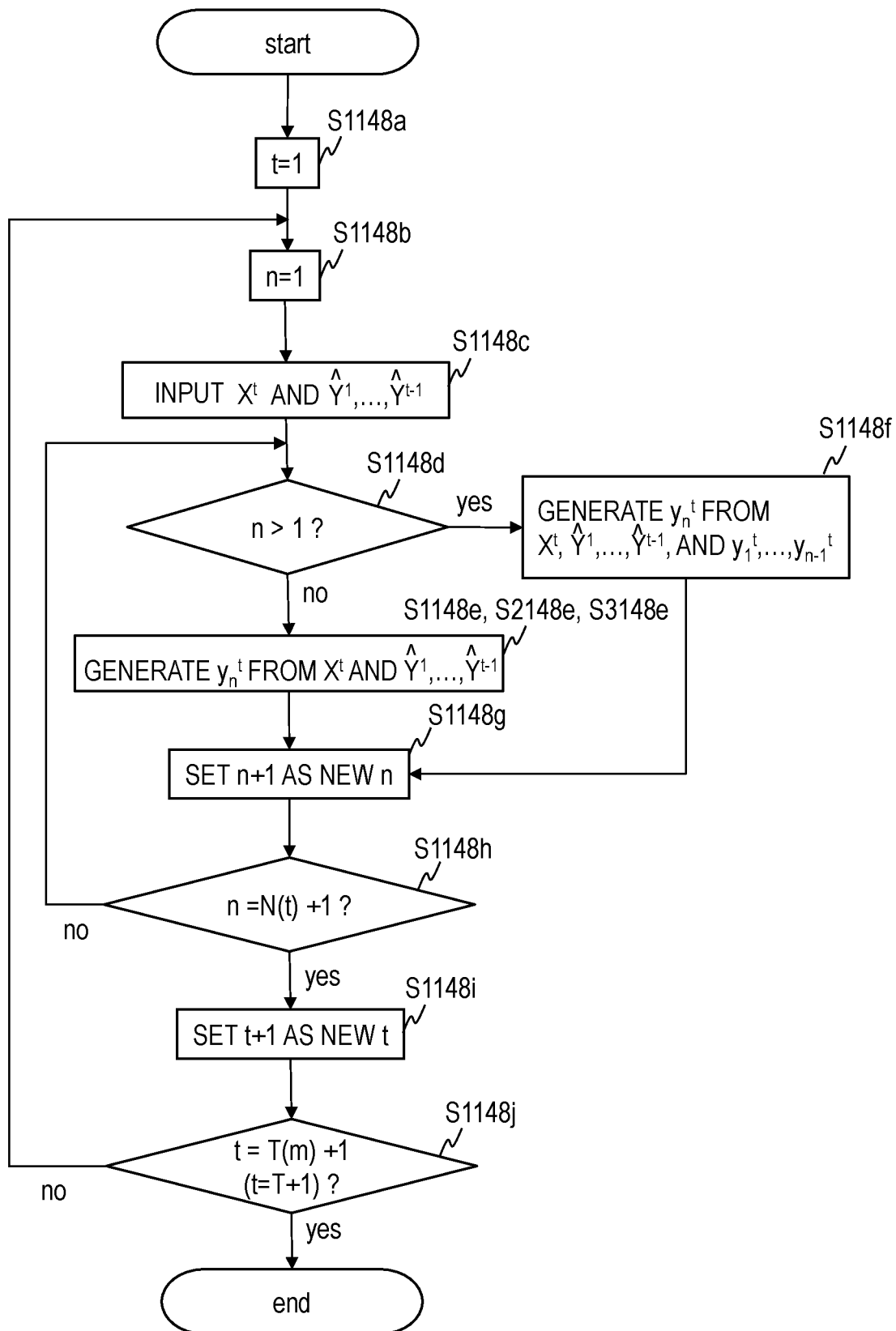
FIG. 5 is a flow chart for describing the processing executing by a text generation unit according to the first embodiment.

As illustrated in FIG. 5, first, the control unit 1140 initializes t to t=1 (step S1148*a*). Also, the control unit 1140 initializes n to n=1 (step S1148*b*).

The word string $X^t$ of the read word text is input to the vector calculation unit 1142, and the word strings $Y^{\wedge 1}, \ldots, Y^{\wedge t-1}$ of the calculated written word text are input to the vector calculation unit 1141. Note that in a case of t=1, there is no word string of the calculated written word text. Thus, no word string of the calculate written word text is entered (step S1148*c*).

The control unit 1140 determines whether or not n satisfies n>1 (step S1148*d*). Here, in a case where n satisfies n>1, the estimation unit 114 generates and outputs $y_n^t$ from $X^t$, $Y^1, \ldots, Y^{t-1}$, and $y_1^t, \ldots, y_{n-1}^t$. However, in a case where t satisfies t=1, the estimation unit 114 generates and outputs $y_n^t$ from $X^t$ and $y_1^t, \ldots, y_{n-1}^t$ (step S1148*f*). On the other hand, in a case where n does not satisfy n>1, the estimation unit 114 generates and outputs $y_n^t$ from $X^t$ and $Y^1, \ldots, Y^{t-1}$. However, in a case where t satisfies t=1, the estimation unit 114 generates and outputs $y_n^t$ from $X^t$ as described above (step S1148*e*).

Next, the control unit 1140 sets n+1 as the new n (step S1148*g*). The control unit 1140 determines whether n satisfies n=N(t)+1 (step S1148*h*). Here, in a case where n does not satisfy n=N(t)+1, the control unit 1140 returns the processing to step S1148*d*. On the other hand, in a case where n satisfies n=N(t)+1, the control unit 1140 sets t+1 as the new t (step S1148*i*). Furthermore, the control unit 1140 determines whether t has exceeded the upper limit, that is, whether now t satisfies t=T(m)+1 or t=T+1 (step S1148*j*). In a case where t is not greater than the upper limit, the control unit 1140 returns the processing to step S1148*b*. On the other hand, in a case where t exceeds the upper limit, the processing ends.

In this way, if the current spoken word text can be converted taking into account the previous written word text, information of how the spoken word text has been rewritten can be taken into account in rewriting the current written word text. For example, consider a case where spoken word text that is the recognition result of a speech of a lecture lasting a few minutes being converted to written word text. When the speech of the lecture is split up at silences lasting 0.5 seconds, the speech includes 200 utterances. The 200 utterances constitutes a continuous sequence, and it is highly plausible that the continuous utterances correspond to talk about related information. However, when known technology is applied, the spoken word text, which is the speech recognition result of the 200 utterances is independently converted to written word text, making the related context information unable to be used in executing the current spoken word to written word conversion. More specifically, assume a case where, for spoken word text, the speech recognition result of the utterance No. 0 is "(Well, you will cancel the Internet contract by this phone number" and the result of the utterance No. 1 is "by phone number, won't you?". If the utterance No. 0 is taken into account, the "by phone number" of the utterance No. 1 can be determined to be a filled pause spanning across both utterances, and thus "won't you?" can conceivably be converted to text with the filled pause deleted. Also, assume a case where the speech recognition result of the utterance No. 2 is the spoken word text "'n I want to cancel the options, too". by taking into account the context, the "'n" at the beginning of the sentence can be determined to be a connector and recognized as meaning "And, I want to cancel the options, too". However, in a case where the context is not taken into account, the utterance No. 2 may be recognized as "I want to cancel the options, too" with the "て (II)" being deleted because the connector at the beginning of the sentence is mistakenly recognized as filler. However, such an issue can be conceivable to be solved by using the information of the written word text from the utterance No. 1 to the utterance No. 1 as context.

Next, an example of the relationship between spoken word, which is spoken word text converted using the method of the present embodiment and written word, which is post-conversion written word text, will be described. The underlined words of the spoken word have been deleted from the written word.

(a) Interaction with Contact Center

Spoken word: <u>Ah . . . well</u> I use it less than before, <u>meaning,</u> since the other day, I started to go to lessons, <u>well.</u>

Written word: I use it less than before, since the other day, I started to go to lessons.

(b) Daily Conversation (1)

Spoken word: Professional baseball, <u>yeah,</u> baseball games, <u>oh,</u> I don't know most of the rules, but I watch high school baseball games.

Written word: About professional baseball games, I don't know most of the rules. But I watch high school baseball games.
(c) Daily Conversation (2)
Spoken word: 'n, somewhat, I wish we could buy such things, well yeah, but not soft-serve ice cream, at a convenience store or the like, I wish, just personally, yeah.
Written word: I wish we could buy such things, but not soft-serve ice cream, at a convenience store or the like, just personally.
(e) Answering Machine
Spoken word: Ah, hello, well, I am telling you that the morning meeting was over, well, and after the meeting, I came here, Akihabara station, ah, I will take lunch, ah and then go to Takadanobaba station to have a next meeting, ah, as such, I made this call, ah, I will call later, thank you!
Written word: I am telling you that the morning meeting was over. After the meeting, I came here, Akihabara station. I will take lunch, then go to Takadanobaba station to have a next meeting. I will call later, thank you!

Second Embodiment

Figure 6:
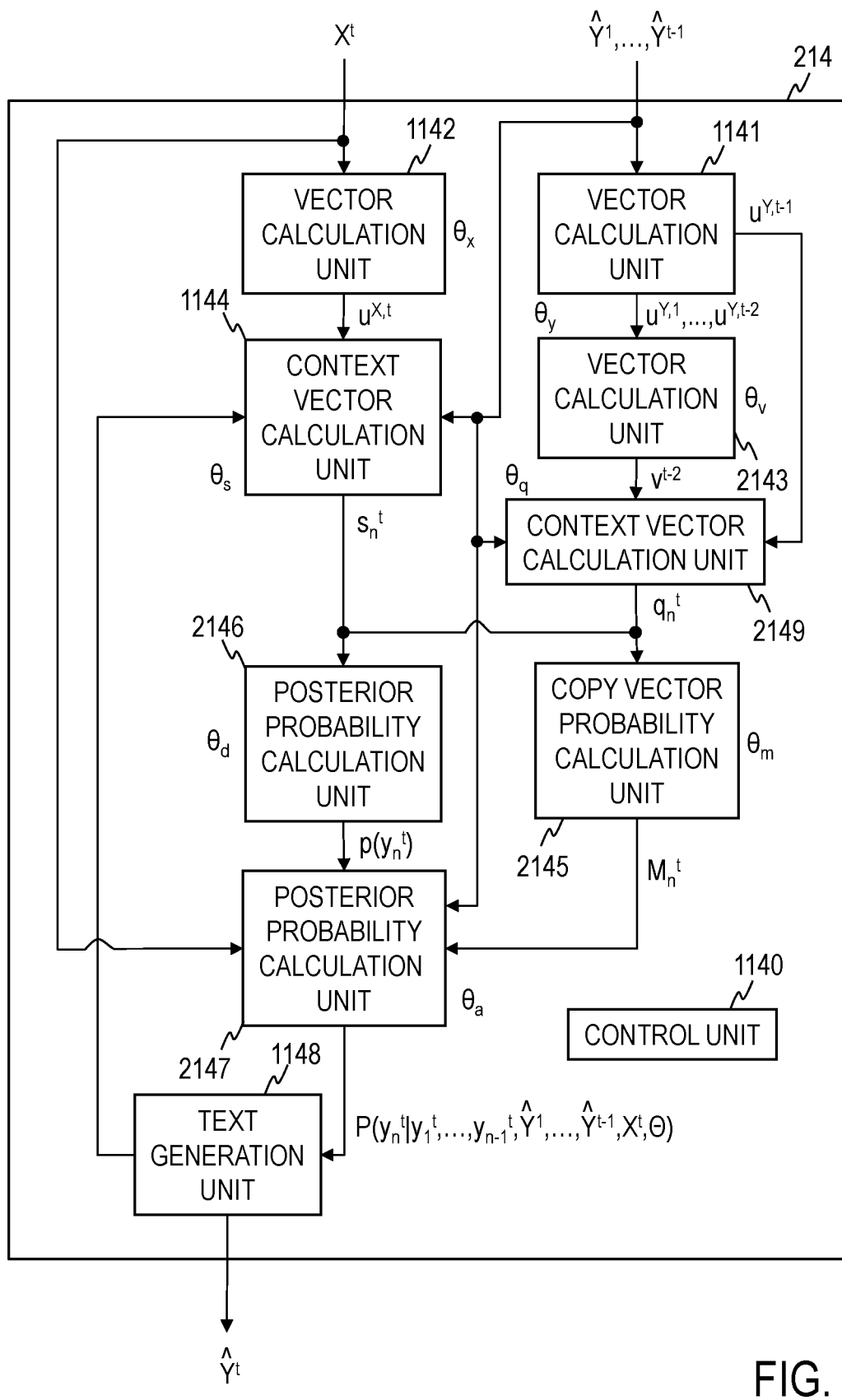
FIG. 6 is a block diagram illustrating a functional configuration of an estimation unit according to a second embodiment.

It is also possible to copy words from the written word text just previous and generate written word text, in addition to the spoken word text of the text that is the target of the spoken word to written word conversion. Here, all of the previous written word text is not targetted for copying because the framework of the neural sequence conversion model is designed to convert the overall text to vectors, which causes the issue of poor performance with long text, making it impractical. The details of a spoken word to written word conversion in which previous written word text is also copied are given below.
Configuration
As illustrated in FIG. 1A, a sequence conversion device 21 of a second embodiment includes the control unit 1, storage units 211, 113, the input unit 112, an estimation unit 214, and the output unit 115. The sequence conversion device 21 executes processing under the control of the control unit 1. As illustrated in FIG. 1B, a machine learning device 22 of the second embodiment includes the control unit 120, the storage units 121, 123, 127, the estimation unit 214, the output unit 125, and a learning unit 226. The machine learning device 22 executes processing under the control of the control unit 120.
Sequence Conversion Processing
Intralingual translation processing, which is sequence conversion processing executed by the sequence conversion device 21 of the second embodiment, will now be described. The translation processing of the sequence conversion device 21 of the second embodiment differs from the sequence conversion processing of the sequence conversion device 11 of the first embodiment in that the processing of step S114 executed by the estimation unit 114 of FIG. 2 is replaced with the processing of step S214 executed by the estimation unit 214. Other matters are the same as in the first embodiment.
Machine Learning Processing
Machine learning processing by the machine learning device 22 of the second embodiment will now be described. The machine learning processing executed by the machine learning device 22 of the second embodiment differs from the machine learning processing executed by the machine learning device 12 of the first embodiment in that the processing of step S114 executed by the estimation unit 114 of FIG. 3 is replaced with the processing of step S214 executed by the estimation unit 214. Other matters are the same as in the first embodiment.
Details of Estimation Unit 214
Details of the estimation unit 214 will now be described. As illustrated in FIG. 6, the estimation unit 214 includes the control unit 1140, vector calculation units 1141, 1142, 2143, the context vector calculation unit 1144 (first context vector calculation unit), a context vector calculation unit 2149 (second context vector calculation unit), a copy vector probability calculation unit 2145, posterior probability calculation units 2146, 2147, and the text generation unit 1148. The estimation unit 214 executes processing under the control of the control unit 1140. Here, the model parameter θ of the second embodiment includes model parameters $\theta_y$, $\theta_x$, $\theta_s$, $\theta_v$, $\theta_q$, $\theta_d$, $\theta_m$, $\theta_a$ and is represented as $\theta=\{\theta_y, \theta_x, \theta_s, \theta_v, \theta_q, \theta_d, \theta_m, \theta_a\}$.
Vector Calculation Unit 2143 (Third Vector Calculation Unit)
Input: sequence $u^{Y, 1}, \ldots, u^{Y, t-2}$ of the text vector $u^{Y, i}$ for previous word strings of spoken word text
model parameter $\theta_v$
Output: the (t−2)-th written word text sequence embedded vector $v^{t-2}$
The vector calculation unit 1143 converts the sequence $u^{Y, 1}, \ldots, u^{Y, t-2}$ of the text vector $u^{Y, i}$ for a previous written word text sequence to the (t−2)-th written word text sequence embedded vector $v^{t-2}$ by a conversion function based on the model parameter $\theta_v$. The vector calculation unit 2143 differs from the vector calculation unit 1143 in that $u^{Y, 1}, \ldots, u^{Y, t-2}$ is input instead of $u^{Y, 1}, \ldots, u^{Y, t-1}$, and $v^{t-2}$ is output instead of $v^{t-1}$. Note that, in the case of t=1, 2, since there is no text vector sequence for the previous word strings of spoken word text, the written word text sequence embedded vectors $v^{-1}$ and $v^0$ output by the vector calculation unit 2143 are vectors in which all of the factors are 0.0.
Context Vector Calculation Unit 2149 (Second Context Vector Calculation Unit)
Input: word string $y_1^t, \ldots, y_{n-1}^t$ previous to the n-th word of the t-th word string of written word text the (t−2)-th written word text sequence embedded vector $v^{t-2}$
sequence $u^{Y, t-1}$ of the text vector for the (t−1)-th word string of written word text
model parameter $\theta_q$
Output: context vector $q_n^t$ for the n-th word in the t-th word string $Y^t$ of written word text taking into account the previous spoken word text
The context vector calculation unit 2149 applies a conversion function based on the model parameter $\theta_q$ on the word string $y_1^t, \ldots, y_{n-1}^t$ previous to the n-th word of the t-th word string of written word text, the (t−2)-th written word text sequence embedded vector $v^{t-2}$, and the sequence $u^{Y, t-1}$ of the text vector for the (t−1)-th word string of written word text, to obtain and output the context vector $q_n^t$ for the n-th word of the t-th word string $Y^t$ of written word text. The context vector $q_n^t$ is embedded with semantic information taking into account previous conversion results required for spoken word to written word conversion of the next word. Any function that can convert three types of vector strings of variable length to a single vector can be used as the conversion function here. An example of this conversion function includes a function that outputs a single context vector by applying a recurrent neural network to the sequence $u^{Y, t-1}$ of the text vector for the word string $y_1^t, \ldots, y_{n-1}^t$ previous to the n-th word of the t-th word string of written word text and the (t−1)-th word string of written word text, combining the sequence $u^{Y, t-1}$ of the text vector for the (t−1)-th word string of written word text and the (t−2)-th written word text sequence embedded vector $v^{t-2}$, and applying an attention mechanism. In other words, the context vector calculation unit 2149 (second context vector calculation unit) executes conversion based on the model parameter $\theta_q$ on the word string $y_1^t, \ldots, y_{n-1}^t$, the written word text sequence embedded vector (second text sequence embedded vector) $v^{t-2}$, and the sequence $u^{Y, t-1}$ to obtain and output the context vector $q_n^t$ for the n-th word in the t-th word string $Y^{\wedge t}$ of written word text (second text) taking into account previous written word text (second text).

Copy Vector Probability Calculation Unit 2145
  Input: context vector $s_n^t$ for the n-th word in the t-th word string $Y^{\wedge t}$ of written word text context vector $q_n^t$ for the n-th word in the t-th word string $Y^{\wedge t}$ of written word text taking into account the previous spoken word text
  model parameter $\theta_m$
  Output: copy probability $M_n^t$ for the n-th word in the t-th word string $Y^{\wedge t}$ of written word text The copy vector probability calculation unit 2145 applies the conversion function based on the model parameter $\theta_m$ to the context vector $s_n^t$ for the n-th word in the t-th word string $Y^{\wedge t}$ of written word text and the context vector $q_n^t$ for the n-th word of the t-th word string $Y^{\wedge t}$ of written word text taking into account previous spoken word text to obtain and output the copy probability $M_n^t$ for the n-th word in the t-th word string $Y^{\wedge t}$ of written word text. This copy probability vector $M_n^t$ represents the probability in selecting whether to put emphasis on the posterior probability of the current written word text, copy the word of the spoken word text, or copy the word of the previous written word text in outputting the n-th word of the t-th word string of written word text. Thus, the posterior probability can be expressed as a vector in which the factors are the probabilities and can be expressed as a posterior probability distribution by vector conversion. Any function that can convert two types of vectors to a probability distribution can be used as the conversion function here. An example of the conversion function is a function for performing conversion on a combined vector of two input vectors using a softmax function and outputting this. In other examples, the conversion function may be a function in which a sum of factors of an output vector corresponding to the output probability distribution can be converted to 1.0. In other words, the copy vector probability calculation unit 2145 executes conversion based on the model parameter $\theta_m$ on the context vector $s_n^t$ and the context vector $q_n^t$ for the n-th word of the t-th word string $Y^{\wedge t}$ of written word text (second text), to obtain and output the copy probability $M_n^t$ for the n-th word in the t-th word string $Y^{\wedge}t$ of written word text (second text).

Posterior Probability Calculation Unit 2146 (First Posterior Probability Calculation Unit)
  Input: context vector $s_n^t$ for the n-th word in the t-th word string $Y^{\wedge t}$ of written word text context vector $q_n^t$ for the n-th word in the t-th word string $Y^{\wedge t}$ of written word text taking into account the previous spoken word text
  model parameter $\theta_d$
  Output: posterior probability $P(y_n^t)$ for the n-th word $y_n^t$ in the t-th word string $Y^{\wedge t}$ of written word text The posterior probability calculation unit 2146 executes the conversion function based on the model parameter $\theta_d$ on the context vector $s_n^t$ for the n-th word in the t-th word string $Y^{\wedge t}$ of written word text and the context vector $q_n^t$ for the n-th word in the t-th word string $Y^{\wedge t}$ of written word text taking into account previous spoken word text to obtain and output the posterior probability $P(y_n^t)$ for the n-th word $y_n^t$ in the t-th word string $Y^{\wedge t}$ of written word text. Regarding other matters, the processing is the same as the processing by the posterior probability calculation unit 1146 except that $v^{t-1}$ is replaced with $q_n^t$ and $\theta_w$ is replaced by $\theta_d$, and so the description of similar processing is omitted. In other words, the posterior probability calculation unit 2146 (first posterior probability calculation unit) executes conversion based on the model parameter $\theta_d$ on the context vector $s_n^t$ and the context vector $q_n^t$ for the n-th word in the t-th word string $Y^{\wedge t}$ of the written word text (second text), to obtain and output the posterior probability $P(y_n^t)$ for the word $y_n^t$.

Posterior Probability Calculation Unit 2147 (Second Posterior Probability Calculation Unit)
  Input: posterior probability $P(y_n^t)$ for n-th word in the t-th word string $Y^{\wedge t}$ of written word text
  the t-th word string $X^t$ of spoken word text
  the (t−1)-th word string $Y^{\wedge t-1}$ of written word text
  copy probability $M_n^t$ for the n-th word in the t-th word string $Y^{\wedge t}$ of written word text
  model parameter $\theta_a$
  Output: posterior probability for n-th word $y_n^t$ of the t-th word string of written word text $$P(y_n^t | y_1^t, \ldots, y_{n-1}^t, Y^{\wedge 1}, \ldots, Y^{\wedge t-1}, X^t, \theta)$$

The posterior probability calculation unit 2147 applies a conversion function based on the model parameter $\theta_a$ on the t-th word string $X^t$ of spoken word text, the (t−1)-th word string $Y^{\wedge t-1}$ of written word text, and the copy probability $M_n^t$ for the n-th word in the t-th word string $Y^{\wedge t}$ of written word text to obtain and output the posterior probability $P(y_n^t | y_1^t, \ldots, y_{n-1}^t, Y^{\wedge 1}, \ldots, Y^{\wedge t-1}, X^t, \theta)$ for the n-th word $y_n^t$ in t-th word string of written word text. An example of the conversion function used here is a function that outputs the result of summation of a factor of the copy probability $M_n^t$ for the word multiplied by the posterior probability $P(y_n^t)$, a factor of the copy probability $M_n^t$ for the word multiplied by a distribution of the word obtained from the t-th word string $X^t$ of spoken word text, and a factor of the copy probability $M_n^t$ for the word multiplied by a distribution of the word obtained from the (t−1)-th word string $Y^{\wedge t-1}$ of written word text. As the method for obtaining the distribution of words from the word sequence $X^t$, a method for obtaining any distribution from the vector in the word sequence $X^t$ can be used. In a simpler example the result of a conversion to frequency vectors of the word string $X^t$ using a softmax function can be used as the word distribution. In other words, the posterior probability calculation unit 2147 (second posterior probability calculation unit) executes conversion based on the model parameter $\theta_a$ on the word string $X^t$ of spoken word text (first text), the (t−1)-th word string $Y^{\wedge t-1}$ of written word text (second text), the posterior probability $P(y_n^t)$, and the copy probability $M_n^t$ to obtain and output the posterior probability $P(y_n^t | y_1^t, \ldots, y_{n-1}^t, Y^{\wedge 1}, \ldots, Y^{\wedge t-1}, X^t, \theta)$ corresponding to the posterior probability $P(Y^t | Y^{\wedge 1}, \ldots, Y^{\wedge t-1}, X^t, \theta)$.

For a sequence of word strings of continuous spoken word text that is the target of spoken word to written word conversion, it is highly plausible that there is information related across text. Taking spoken word to written word conversion as an example, words appearing in previous written word text may also be useful in the current conversion. As such, it is believed that by enabling the copying of words also from previous written word text and not just words appearing in the current spoken word text, a more appropriate conversion to written word text can be achieved.

Third Embodiment

A third embodiment described below is a concept including the first and second embodiments.

Configuration

As illustrated in FIG. 1A, a sequence conversion device 31 of the third embodiment includes the control unit 1, the storage units 211, 113, the input unit 112, an estimation unit 314, and the output unit 115. The sequence conversion device 31 executes processing under the control of the control unit 1. As illustrated in FIG. 1B, a machine learning device 32 of the third embodiment includes the control unit 120, the storage units 121, 123, 127, the estimation unit 314, the output unit 125, and the learning unit 226. The machine learning device 32 executes processing under the control of the control unit 120.

Sequence Conversion Processing

Intralingual translation processing, which is sequence conversion processing executed by the sequence conversion device 31 of the third embodiment, will now be described. The sequence conversion processing of the sequence conversion device 31 of the third embodiment differs from the sequence conversion processing of the sequence conversion device 11 of the first embodiment in that the processing of step S114 executed by the estimation unit 114 of FIG. 2 is replaced with the processing of step S314 executed by the estimation unit 314. Other matters are the same as in the first embodiment.

Machine Learning Processing

Machine learning processing by the machine learning device 32 of the third embodiment will now be described. The machine learning processing executed by the machine learning device 32 of the third embodiment differs from the machine learning processing executed by the machine learning device 12 of the first embodiment in that the processing of step S114 executed by the estimation unit 114 of FIG. 3 is replaced with the processing of step S314 executed by the estimation unit 314. Other matters are the same as in the first embodiment.

Details of Estimation Unit 314

Figure 7:
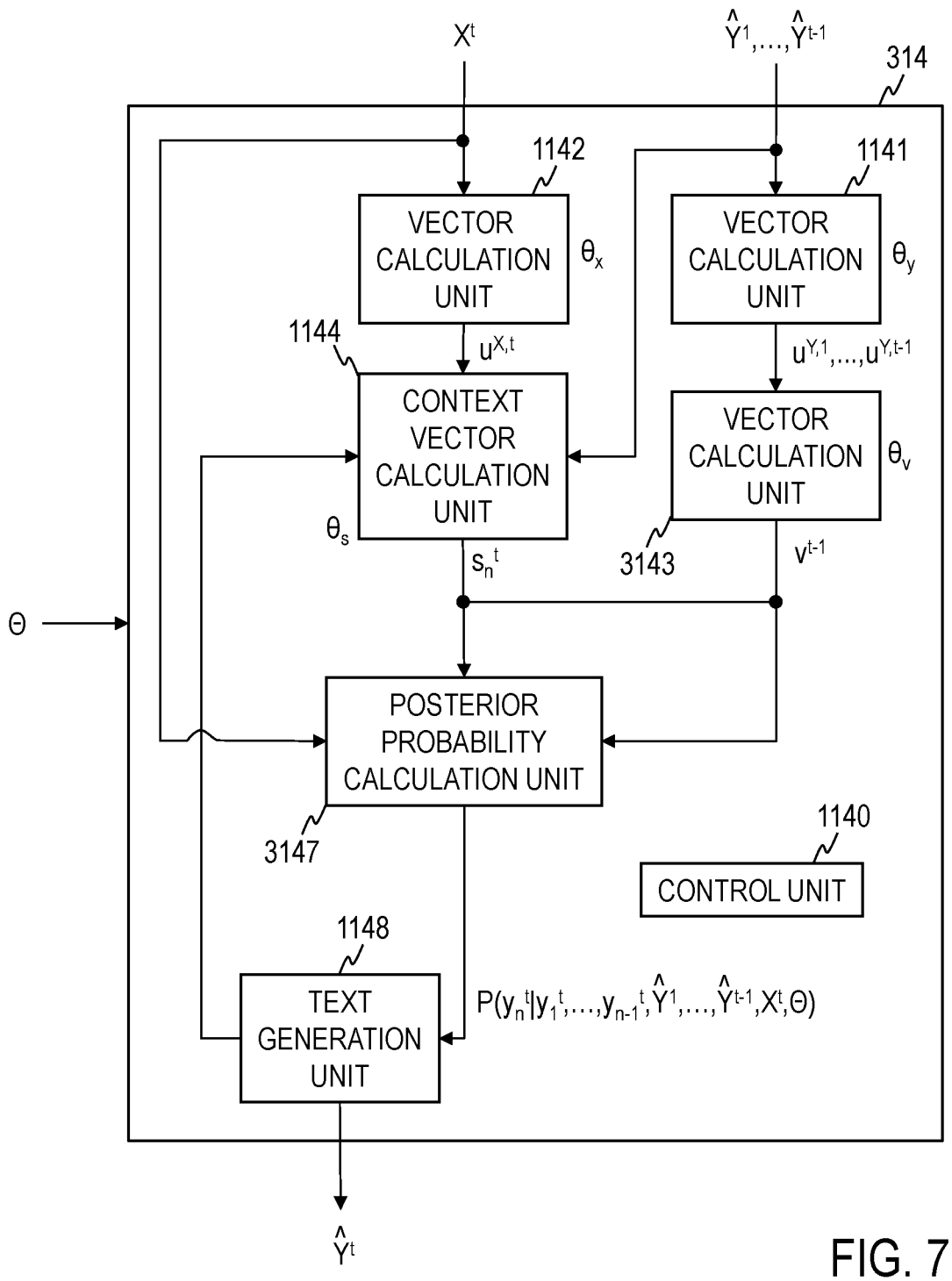
FIG. 7 is a block diagram illustrating a functional configuration of an estimation unit according to a third embodiment.
Figure 10:
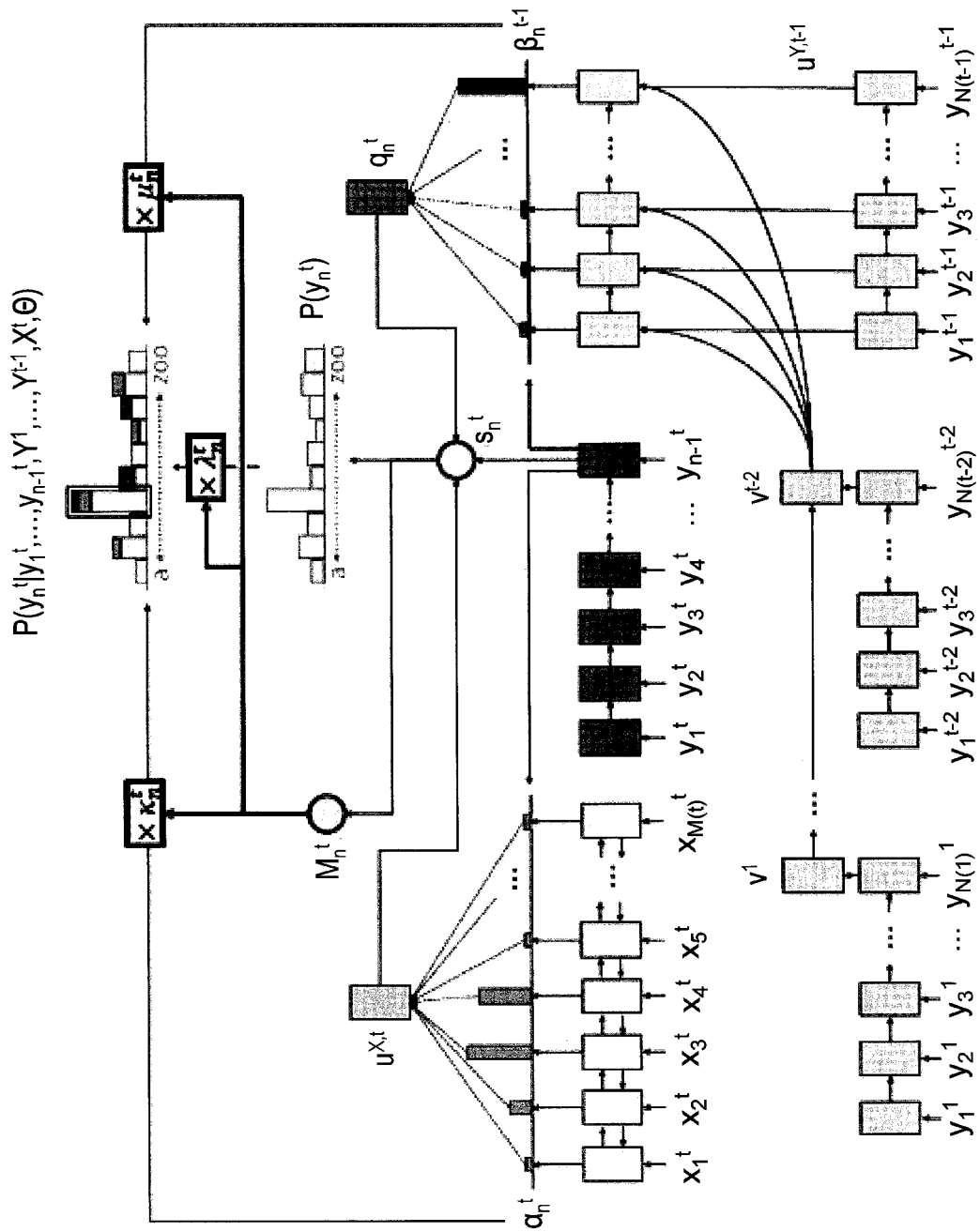
FIG. 10 is a diagram illustrating a flow of sequence conversion processing.

Details of the estimation unit 314 will now be described. As illustrated in FIG. 7, the estimation unit 314 includes the control unit 1140, vector calculation units 1141, 1142, 3143, a posterior probability calculation unit 3147, and the text generation unit 1148. The estimation unit 314 executes processing under the control of the control unit 1140. The model parameter $\theta$ of the third embodiment includes model parameters $\theta_y$, $\theta_x$, $\theta_s$, $\theta_v$.

The vector calculation unit 1141 (the first vector calculation unit) executes conversion based on the model parameter $\theta_y$ on the sequence $Y^{\wedge 1}, \ldots, Y^{\wedge t-1}$ of the word string $Y^{\wedge i}$ of the input written word text (second text) to obtain and output the sequence $u^{Y,1}, \ldots, u^{Y,t-1}$ of the text vector $u^{Y,i}$ of the word string $Y^{\wedge 1}$ of written word text (second text) with i=1, t−1.

The vector calculation unit 1142 (first vector calculation unit) executes conversion based on the model parameter $\theta_x$ on the word string $X^t$ of the input spoken word text (first text) to obtain and output the text vector $u^{X,t}$ of the word string $X^t$ of spoken word text (first text).

The vector calculation unit 3142 (third vector calculation unit) executes conversion based on the model parameter $\theta_v$ on the input sequence $u^{Y,1}, \ldots, u^{Y,t-1}$ to obtain and output the written word sequence embedded vector (second text sequence embedded vector).

The context vector calculation unit 1144 executes conversion based on the model parameter $\theta_s$ on the word string $y_1^t, \ldots, y_{n-1}^t$ previous to the n-th word $y_n^t$ included in the word string $Y^{\wedge t}$ of written word text (second text) and the text vector $u^{X,t}$ to obtain and output the context vector $s_n^t$.

The posterior probability calculation unit 3147 obtains and outputs the posterior probability $P(y_n^t|y_1^t, \ldots, y_{n-1}^t, Y^{\wedge 1}, \ldots, Y^{\wedge t-1}, X^t, \theta)$ corresponding to the posterior probability $P(Y^t|Y^{\wedge 1}, \ldots, Y^{\wedge t-1}, X^t, \theta)$ on the basis of the written word sequence embedded vector (second text sequence embedded vector), the context vector $s_n^t$, and the word string $X^t$ of the first text.

The text generation unit 1148 selects for each one of n=1, ..., N(t) the word $y_n^t$ such that the product of the posterior probability $P(y_1^t|Y^{\wedge 1}, \ldots, Y^{\wedge t-1}, X^t, \theta), \ldots, P(y_n^t|y_1^t, \ldots, y_{n-1}^t, Y^{\wedge 1}, \ldots, Y^{\wedge t-1}, X^t, \theta)$ for the first n words $y_1^t, \ldots, y_n^t$ of the t-th word string $Y^{\wedge t}$ of written word text is the maximum to obtain and output the t-th word string $Y^{\wedge t}=(y_1^t, \ldots, y_{N(t)}^t)$ of written word text.

Experimental Results

The experimental results are shown in FIG. 9 to illustrate the effects of the first and second embodiments. In FIG. 9, No. 0 represents the evaluation result for the word string of spoken word text as is, No. 1 represents the evaluation result for the word string of written word text obtained by spoken word to written word conversion using the method of NPL 1, No. 2 represents the evaluation result for the word string of written word text obtained by spoken word to written word conversion using the method of Reference Literature 1, No. 3 represents the evaluation result for the word string of written word text obtained by spoken word to written word conversion according to the embodiment described above without executing copying, No. 4 represents the evaluation result for the word string of written word text obtained by spoken word to written word conversion according to the first embodiment, and No. 5 represents the evaluation result for the word string of written word text obtained by spoken word to written word conversion according to the second embodiment.

The spoken word to written word conversion corpus described in Reference Literature 5 was used in the experiments.

Reference Literature 5: Kikuo Maekawa, Hanae Koiso, Sadaoki Furui, and Hitoshi Isahara, "Spontaneous speech corpus of Japanese," in Proc. International Conference on Language Resources and Evaluation (LREC), 2000, pp. 947-9520.

This corpus is composed of a set of couples of spoken word text and written word text, which were divided into a training data set, a verification set, and a test set (Tests 1, 2, and 3). An automatic speech recognition device was also prepared for automatic speech recognition of the test set. "Accuracy (%)" in "Manual transcriptions" in FIG. 9 represents the accuracy of the written word obtained by spoken word to written word conversion on the spoken word text of the test set against the written word text that makes a couple with the spoken word text of the test set. "Number of substitution errors" in "Manual transcriptions" represents the number of substitute errors of the written word obtained by spoken word to written word conversion on the spoken word text of the test set against the written word text that makes a couple with the spoken word text of the test set.

"Accuracy (%)" in "ASR transcriptions" represents the accuracy of the written word text obtained by spoken word to written word conversion against the spoken word text obtained by automatic speech recognition. The functional configuration of the second embodiment used in the experiment is also indicated in the diagram. Note that the posterior probability calculation unit 2147 of the second embodiment applies a conversion function based on the model parameter $\theta_a$ on the t-th word string $X^t$ of spoken word text, the (t−1)-th word string $Y^{\wedge t-1}$ of written word text, and the copy probability $M_n^t$ for the n-th word in the t-th word string $Y^{\wedge t}$ of written word text to obtain and output the posterior probability $P(y_n^t | y_1^t, \ldots, y_{n-1}^t, Y^{\wedge 1}, \ldots, Y^{\wedge t-1}, X^t, \theta)$ for the n-th word $y_n^t$ of the t-th word string of written word text. In the experiment, we used, as the conversion function, th function that outputs, as the posterior probability $P(y_n^t | y_1^t, \ldots, y_{n-1}^t, Y^{\wedge 1}, \ldots, Y^{\wedge t-1}, X^t, \theta)$, the result of summation of a factor $\lambda_n^t$ of the copy probability $M_n^t$ for the word multiplied by the posterior probability $P(y_n^t)$, a factor $\kappa_n^t$ of the copy probability $M_n^t$ for the word multiplied by a distribution $\alpha_n^t$ of the word that is obtained from the t-th word string $X^t$ of spoken word text, and a factor $\mu_n^t$ of the copy probability $M_n^t$ for the word multiplied by a distribution $\beta_n^t$ of the word that is obtained from the (t−1)-th word string $Y^{\wedge t-1}$ of written word text. Note that the verification set was used to verify the trained model with data not included in the training data set and make a final adjustment to the parameter θ.

As indicated in FIG. 9, it can be seen that by using the method of the first and second embodiments, the current text can be paraphrased using information of how the previous text has been paraphrased, allowing for highly accurate intralingual translation consistent with the context to be achieved.

Hardware Configuration

The sequence conversion devices 11, 21, 31 and the machine learning devices 12, 22, 32 according to the embodiments are devices configured by a general-purpose or dedicated computer with, for example, a processor (hardware processor) such as a central processing unit (CPU) or a graphics processing unit (GPU), a memory such as a random access memory (RAM), and read only memory (ROM), and the like executing a predetermined program. The computer may include a single processor or memory, or may include multiple processors and memories. The program may be installed on the computer or may be previously recorded in a ROM or the like. Furthermore, some or all of processing units may be configured using an electronic circuit that implements processing functions alone rather than an electronic circuit (circuitry) such as a CPU that implements a functional configuration by reading a program. Moreover, an electronic circuit constituting one apparatus may include multiple CPUs.

Figure 11:
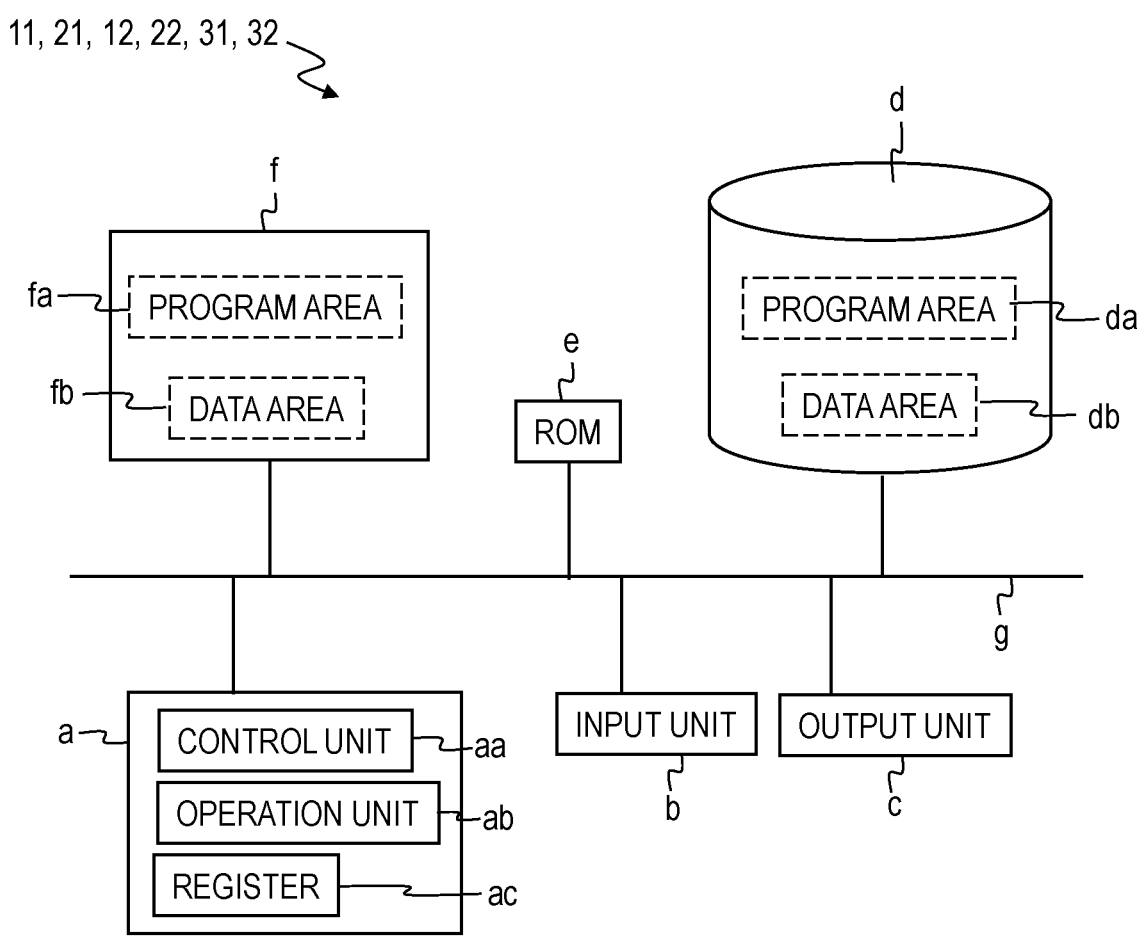
FIG. 11 is a diagram illustrating a hardware configuration according to an embodiment.

FIG. 11 is a block diagram illustrating a hardware configuration of the sequence conversion devices 11, 21, 31 and the machine learning devices 12, 22, 32 according to the embodiments. As illustrated in FIG. 11, the sequence conversion devices 11, 21, 31 and the machine learning devices 12, 22, 32 in the present embodiments include a central processing unit (CPU) a, an input unit b, an output unit c, a random access memory (RAM) d, a read only memory (ROM) e, an auxiliary storage device f, and a bus g. The CPU a of the present embodiments includes a control unit aa, an operation unit ab, and a register ac and executes various arithmetic processing in accordance with various programs read into the register ac. The input unit b is an input terminal, a keyboard, a mouse, a touch panel, or the like via which data is input. In addition, the output unit c is an output terminal, a display, a LAN card or the like that is controlled by the CPU a loaded with a predetermined program, or the like via which data is output. In addition, the RAM d is a static random access memory (SRAM), a dynamic random access memory (DRAM), or the like, and includes a program area da in which a predetermined program is stored and a data area db in which various types of data are stored. In addition, the auxiliary storage device f is, for example, a hard disk, a magneto-optical (MO) disc, a semiconductor memory, and the like, and includes a program area fa in which a predetermined program is stored and a data area fb in which various types of data are stored. In addition, the bus g connects the CPU a, the input unit b, the output unit c, the RAM d, the ROM e, and the auxiliary storage device f with one another to enable information to be exchanged. The CPU a writes a program stored in the program area fa of the auxiliary storage device f to the program area da of the RAM d in accordance with a read operating system (OS) program. Similarly, the CPU a writes various data stored in the data area fb of the auxiliary storage device f to the data area db of the RAM d. Then, the addresses on the RAM d to which this program or data has been written are stored in the register ac of the CPU a. The control unit aa of the CPU a sequentially reads these addresses stored in the register ac, reads the program and data from the area on the RAM d indicated by the read addresses, causes the operation unit ab to perform operations indicated by the program, and stores the calculation results in the register ac. With such a configuration, the functional configurations of the sequence conversion devices 11, 21, 31 and the machine learning devices 12, 22, 32 are implemented.

The above-described program can be recorded on a computer-readable recording medium. An example of the computer-readable recording medium is a non-transitory recording medium. Examples of such a recording medium include a magnetic recording device, an optical disc, a magneto-optical recording medium, or a semiconductor memory.

The program is distributed, for example, by selling, transferring, or lending a portable recording medium such as a DVD or a CD-ROM with the program recorded on it. Further, the program may be stored in a storage device of a server computer and transmitted from the server computer to another computer via a network, so that the program is distributed. For example, a computer that executes such a program first temporarily stores the program recorded on the portable recording medium or the program forwarded from the server computer in its own storage device. When executing the processing, the computer reads the program stored in its own storage device and executes the processing in accordance with the read program. Further, as another execution form of this program, the computer may directly read the program from the portable recording medium and execute processing in accordance with the program, or, further, may sequentially execute the processing in accordance with the received program each time the program is transferred from the server computer to the computer. In addition, it can also be configured to execute the processing described above through a so-called application service provider (ASP) type service in which processing functions are implemented just by issuing an instruction to execute the program and obtaining results without transmitting the program from the server computer to the computer. Further, the program in this form is assumed to include information which is provided for processing of a computer and is equivalent to a program (data or the like that has characteristics of defining the processing of the computer rather than being a direct instruction to the computer).

In each embodiment, although the present apparatus is configured by executing a predetermined program on a computer, at least a part of the processing details may be implemented by hardware.

The present disclosure is not limited to the above-described embodiment. For example, the various processing operations described above may be executed not only in chronological order as described but also in parallel or on an individual basis as necessary or depending on the processing capabilities of the apparatuses that execute the processing operations. Further, it is needless to say that the present disclosure can appropriately be modified without departing from the gist of the present disclosure.

REFERENCE SIGNS LIST 11, 21, 31 Sequence conversion device
12, 22, 32 Machine learning device

The invention claimed is:

1. A sequence conversion device, comprising processing circuitry configured to estimate information corresponding to a t-th word string $Y^t$ of a second text, which is a conversion result of a t-th word string $X^t$ of a first text, on the basis of one or more model parameters θ, by using, as inputs, a t-th word string $X^t$ of the first text and a sequence $Y^{\wedge 1}, \ldots, Y^{\wedge t-1}$ of first to (t−1)-th word strings of the second text, which is a conversion result of a sequence $X^1, \ldots X^{t-1}$ of first to (t−1)-th word strings of the first text, where t is an integer of 2 or greater, wherein the model parameters θ are obtained by machine learning of a model estimating the information corresponding to the t-th word string $Y^t$, using training data which is a set of multiple couples of a sequence of word strings of the first text and a sequence of word strings of the second text, a language of the first text is same as a language of the second text, the model parameters θ include model parameters $θ_y$, $θ_x$, $θ_s$, $θ_v$, $θ_p$, $θ_w$, $θ_o$, and the processing circuitry configured to:

execute conversion based on the model parameter $θ_y$ on the sequence $Y^{\wedge 1}, \ldots, Y^{\wedge t-1}$ of the first (n−1) word strings of the second text to obtain a sequence $u^{Y, 1}, \ldots, u^{Y, t-1}$ of a text vector $u^{Y, i}$ of a word string $Y^{\wedge i}$ of the second text for i=1, . . . , t−1, execute conversion based on the model parameter $θ_x$ on the t-th word string $X^t$ of the first text to obtain a text vector $u^{X, t}$ of the t-th word string $X^t$ of the first text, execute conversion based on the model parameter $θ_v$ on the sequence $u^{Y, 1}, \ldots, u^{Y, t-1}$ to obtain a (t−1)-th second text sequence embedded vector $v^{t-1}$, execute conversion based on the model parameter $θ_s$ on a word string $y_1^t, \ldots, y_{n-1}^t$ previous to an n-th word $y_n^t$ included in a t-th word string $Y^{\wedge t}$ of the second text and the text vector $u^{X, t}$ to obtain a context vector $s_n^t$ for an n-th word of the t-th word string $Y^{\wedge t}$ of the second text taking into account the first text, where n is a positive integer equal to or less than a number of words included in the t-th word string $Y^{\wedge t}$ of the second text, execute conversion based on the model parameter $θ_p$ on the second text sequence embedded vector $v^{t-1}$ and the context vector $s_n^t$ to obtain a copy probability $p_n^t$ for an n-th word of the t-th word string $Y^{\wedge t}$ of the second text where the copy probability $p_n^t$ represents a probability of copying a word from the t-th word string $X^t$, thereby deleting, based on the probability $p_n^t$, operations of copying the word from the t-th word string $X^t$, on the basis of the model parameters θ, execute conversion based on the model parameter $θ_w$ on the second text sequence embedded vector $v^{t-1}$ and the context vector $s_n^t$ to obtain a posterior probability $P(y_n^t)$ for the n-th word $y_n^t$, and execute conversion based on the model parameter $θ_o$ on the t-th word string $X^t$ of the first text, the posterior probability $P(y_n^t)$, and the copy probability $p_n^t$ to obtain a posterior probability $P(y_n^t | y_1^t, \ldots, y_{n-1}^t, Y^{\wedge 1}, \ldots Y^{\wedge t-1}, X^t, θ)$ corresponding to a posterior probability $P(Y^t | Y^{\wedge 1}, \ldots, Y^{\wedge t-1}, X^t, θ)$ of the t-th word string $Y^t$ of the second text given the t-th word string $X^t$ of the first text, the sequence $Y^{\wedge 1}, \ldots Y^{\wedge t-1}$ of the word strings of the second text, and the model parameters θ.

2. A non-transitory computer-readable recording medium storing a program for causing a computer to operate as the sequence conversion device according to claim 1.

3. A sequence conversion device, comprising processing circuitry configured to estimate information corresponding to a t-th word string $Y^t$ of a second text, which is a conversion result of a t-th word string $X^t$ of a first text, on the basis of one or more model parameters θ, by using, as inputs, a t-th word string $X^t$ of the first text and a sequence $Y^{\wedge 1}, \ldots, Y^{\wedge t-1}$ of first to (t−1)-th word strings of the second text, which is a conversion result of a sequence $X^1, \ldots X^{t-1}$ of first to (t−1)-th word strings of the first text, where t is an integer of 2 or greater, wherein the model parameters θ are obtained by machine learning of a model estimating the information corresponding to the t-th word string $Y^t$, using training data which is a set of multiple couples of a sequence of word strings of the first text and a sequence of word strings of the second text, a language of the first text is same as a language of the second text, the model parameters θ include model parameters $θ_y$, $θ_x$, $θ_s$, $θ_v$, $θ_q$, $θ_d$, $θ_m$, $θ_a$, and the processing circuitry configured to:

execute conversion based on the model parameter $θ_y$ on a sequence $Y^{\wedge 1}, \ldots, Y^{\wedge t-1}$ of the word strings of the second text to obtain a sequence $u^{Y, 1}, \ldots, u^{Y, t-1}$ of a text vector $u^{Y, i}$ of a word string $Y^{\wedge i}$ of the second text for i=1, . . . , t−1, execute conversion based on the model parameter $θ_x$ on the t-th word string $X^t$ of the first text to obtain a text vector $u^{X, t}$ of the t-th word string $X^t$ of the first text, execute conversion based on the model parameter $θ_v$ on a sequence $u^{Y, 1}, \ldots, u^{Y, t-2}$ to obtain a (t−2)-th second text sequence embedded vector $v^{t-2}$, execute conversion based on the model parameter $θ_s$ on a word string $y_1^t, \ldots, y_{n-1}^t$ previous to an n-th word $y_n^t$ included in a t-th word string $Y^{\wedge t}$ of the second text and the text vector $u^{X, t}$ to obtain a context vector $s_n^t$ for an n-th word of the t-th word string $Y^{\wedge t}$ of the second text taking into account the first text, where n is a positive integer equal to or less than a number of words included in the t-th word string $Y^{\wedge t}$ of the second text, execute conversion based on the model parameter $θ_q$ on the word string $y_1^t, \ldots, y_{n-1}^t$, the second text sequence embedded vector $v^{t-2}$, and the sequence $u^{Y, t-1}$ to obtain a context vector $g_n^t$ for an n-th word of the t-th word string $Y^{\wedge t}$ of the second text taking into account previous word string of the second text, execute conversion based on the model parameter $\theta_m$ on the context vector $s_n^t$, a (t−1)-th word string $Y^{\wedge t-1}$ of the second text, and the context vector $q_n^t$ for the n-th word of the t-th word string $Y^{\wedge t}$ of the second text to obtain a copy probability $M_n^t$ for the n-th word of the t-th word string $Y^{\wedge t}$ of the second text where the copy probability $M_n^t$ represents a probability of copying a word from the t-th word string $X^t$ or the sequence $Y^{\wedge 1}, \ldots, Y^{\wedge t-1}$, thereby deleting, based on the probability $M_n^t$, operations of copying the word from the t-th word string $X^t$ or the sequence $Y^{\wedge 1}, \ldots, Y^{\wedge t-1}$, on the basis of the model parameters $\theta$, execute conversion based on the model parameter $\theta_d$ on the context vector $s_n^t$ and the context vector $q_n^t$ for the n-th word of the t-th word string $Y^{\wedge t}$ of the second text to obtain a posterior probability $P(y_n^t)$ for the n-th word $y_n^t$, and execute conversion based on the model parameter $\theta_a$ on the t-th word string $X^t$ of the first text, the (t−1)-th word string $Y^{\wedge t-1}$ of the second text, the posterior probability $P(y_n^t)$, and the copy probability $M_n^t$ to obtain a posterior probability $P(y_n^t|y_1^t, \ldots, y_{n-1}^t, Y^{\wedge 1}, \ldots, Y^{\wedge t-1}, X^t, \theta)$ corresponding to a posterior probability $P(Y^t|Y^{\wedge 1}, Y^{\wedge t-1}, X^t, \theta)$ of the t-th word string $Y^t$ of the second text given the t-th word string $X^t$ of the first text, the sequence $Y^{\wedge 1}, \ldots, Y^{\wedge t-1}$ of the word strings of the second text, and the model parameters $\theta$.

4. A non-transitory computer-readable recording medium storing a program for causing a computer to operate as the sequence conversion device according to claim 3.

5. A machine learning device, comprising processing circuitry configured to execute machine learning with training data being a sequence of couples of a word string $A^i$ of a second text and a word string $B^i$ of a first text to obtain one or more model parameters $\theta$ of a model that estimates information corresponding to a t-th word string $Y^t$ of the second text, which is a conversion result of a t-th word string $X^t$ of the first text, on the basis of the model parameter $\theta$, by using, as inputs, a t-th word string $X^t$ of the first text and a sequence $Y^{\wedge 1}, \ldots, Y^{\wedge t-1}$ of first to (t−1)-th word strings of the second text, which is a conversion result of a sequence $X^1, \ldots X^{t-1}$ of first to (t−1)-th word strings of the first text, where t is an integer of 2 or greater, $X^i$ is a word string of the first text, and $Y^i$ is a word string of the second text obtained by rewriting $X^i$, wherein a language of the first text is same as a language of the second text, the model parameters $\theta$ include model parameters $\theta_y$, $\theta_x$, $\theta_s$, $\theta_v$, $\theta_p$, $\theta_w$, $\theta_o$, and the model is configured to:

execute conversion based on the model parameter $\theta_y$ on the sequence $Y^{\wedge 1}, \ldots, Y^{\wedge t-1}$ of the first (n−1) word strings of the second text to obtain a sequence $u^{Y,i}, \ldots, u^{Y,t-1}$ of a text vector $u^{Y,i}$ of a word string $Y^{\wedge i}$ of the second text for $i=1, \ldots, t-1$, execute conversion based on the model parameter $\theta_x$ on the t-th word string $X^t$ of the first text to obtain a text vector $u^{X,t}$ of the t-th word string $X^t$ of the first text, execute conversion based on the model parameter $\theta_v$ on the sequence $u^{Y,1}, \ldots, u^{Y,t-1}$ to obtain a (t−1)-th second text sequence embedded vector $v^{t-1}$, execute conversion based on the model parameter $\theta_s$ on a word string $y_1^t, \ldots, y_{n-1}^t$ previous to an n-th word $y_n^t$ included in a t-th word string $Y^{\wedge t}$ of the second text and the text vector $u^{X,t}$ to obtain a context vector $s_n^t$ for an n-th word of the t-th word string $Y^{\wedge t}$ of the second text taking into account the first text, where n is a positive integer equal to or less than a number of words included in the t-th word string $Y^{\wedge t}$ of the second text, execute conversion based on the model parameter $\theta_p$ on the second text sequence embedded vector $v^{t-1}$ and the context vector $s_n^t$ to obtain a copy probability $p_n^t$ for an n-th word of the t-th word string $Y^{\wedge t}$ of the second text where the copy probability $p_n^t$ represents a probability of copying a word from the t-th word string $X^t$, thereby deleting, based on the probability $p_n^t$, operations of copying the word from the t-th word string $X^t$, on the basis of the model parameters $\theta$, execute conversion based on the model parameter $\theta_w$ on the second text sequence embedded vector $v^{t-1}$ and the context vector $s_n^t$ to obtain a posterior probability $P(y_n^t)$ for the n-th word $y_n^t$, and execute conversion based on the model parameter $\theta_o$ on the t-th word string $X^t$ of the first text, the posterior probability $P(y_n^t)$, and the copy probability $p_n^t$ to obtain a posterior probability $P(y_n^t|y_1^t, \ldots, y_{n-1}^t, Y^{\wedge 1}, \ldots, Y^{\wedge t-1}, X^t, \theta)$ corresponding to a posterior probability $P(Y^t|Y^{\wedge 1}, \ldots, Y^{\wedge t-1}, X^t, \theta)$ of the t-th word string $Y^t$ of the second text given the t-th word string $X^t$ of the first text, the sequence $Y^{\wedge 1}, \ldots, Y^{\wedge t-1}$ of the word strings of the second text, and the model parameters $\theta$.

6. A non-transitory computer-readable recording medium storing a program for causing a computer to operate as the machine learning device according to claim 5.

7. A sequence conversion method, comprising:

estimating information corresponding to a t-th word string $Y^t$ of a second text, which is a conversion result of a t-th word string $X^t$ of a first text, on the basis of one or more model parameters $\theta$ by using, as inputs, the t-th word string $X^t$ of the first text and a sequence $Y^{\wedge 1}, \ldots, Y^{\wedge t-1}$ of first to (t−1)-th word strings of the second text, which is a conversion result of a sequence $X^1, \ldots X^{t-1}$ of first to (t−1)-th word strings of the first text, where t is an integer of 2 or greater, wherein the model parameters $\theta$ are obtained by machine learning of a model estimating the information corresponding to the t-th word string $Y^t$, using training data which is a set of multiple couples of a sequence of word strings of the first text and a sequence of word strings of the second text, a language of the first text is same as a language of the second text, the model parameters $\theta$ include model parameters $\theta_y$, $\theta_x$, $\theta_s$, $\theta_p$, $\theta_w$, $\theta_w$, $\theta_o$, and the sequence conversion method comprises:

executing conversion based on the model parameter $\theta_y$ on the sequence $Y^{\wedge 1}, \ldots, Y^{\wedge t-1}$ of the first (n−1) word strings of the second text to obtain a sequence $u^{Y,1}, \ldots, u^{Y,t-1}$ of a text vector $u^{Y,i}$ of a word string $Y^{\wedge i}$ of the second text for $i=1, \ldots, t-1$, executing conversion based on the model parameter $\theta_x$ on the t-th word string $X^t$ of the first text to obtain a text vector $u^{X,t}$ of the t-th word string $X^t$ of the first text, executing conversion based on the model parameter $\theta_y$ on the sequence $u^{Y,1}, \ldots, u^{Y,t-1}$ to obtain a (t−1)-th second text sequence embedded vector $v^{t-1}$, executing conversion based on the model parameter $\theta_s$ on a word string $y_1^t, \ldots, y_{n-1}^t$ previous to an n-th word $y_n^t$ included in a t-th word string $Y^{\wedge t}$ of the second text and the text vector $u^{X,t}$ to obtain a context vector $s_n^t$ for an n-th word of the t-th word string $Y^{\wedge t}$ of the second text taking into account the first text, where n is a positive integer equal to or less than a number of words included in the t-th word string $Y^{\wedge t}$ of the second text, executing conversion based on the model parameter $\theta_p$ on the second text sequence embedded vector $v^{t-1}$ and the context vector $s_n^t$ to obtain a copy probability $p_n^t$ for an n-th word of the t-th word string $Y^{\wedge t}$ of the second text where the copy probability $p_n^t$ represents a probability of copying a word from the t-th word string $X^t$, thereby deleting, based on the probability $p_n^t$, operations of copying the word firm the t-th word string $X^t$, on the basis of the model parameters θ, executing conversion based on the model parameter $\theta_w$ on the second text sequence embedded vector $v^{t-1}$ and the context vector $s_n^t$ to obtain a posterior probability $P(y_n^t)$ for the n-th word $y_n^t$, and executing conversion based on the model parameter $\theta_o$ on the t-th word string $X^t$ of the first text, the posterior probability $P(y_n^t)$, and the copy probability $p_n^t$ to obtain a posterior probability $P(y_n^t|y_1^t, \ldots, y_{n-1}^t, Y^{\wedge 1}, \ldots, Y^{\wedge t-1}, X^{\wedge t-1}, X^t, \theta)$ corresponding to a posterior probability $P(Y^t|Y^{\wedge 1}, \ldots, Y^{\wedge t-1}, X^t, \theta)$ of the t-th word string $Y^t$ of the second text given the t-th word string $X^t$ of the first text, the sequence $Y^{\wedge 1}, \ldots, Y^{\wedge t-1}$ of the word strings of the second text, and the model parameters θ.

8. A machine learning method, comprising:

executing machine learning with training data being a sequence of couples of a word string $A^i$ of a second text and a word string $B^i$ of a first text to obtain one or more model parameters θ of a model that estimates information corresponding to a t-th word string $Y^t$ of the second text, which is a conversion result of a word string $X^t$ of the t-th first text, on the basis of the model parameters θ, by using, as inputs, a t-th word string $X^t$ of the first text and a sequence $Y^{\wedge 1}, \ldots, Y^{\wedge t-1}$ of first to (t−1)-th word strings of the second text, which is a conversion result of a sequence $X^1, \ldots X^{t-1}$ of first to (t−1)-th word strings of the first text, where t is an integer of 2 or greater, $X^i$ is a word string of the first text, and $Y^i$ is a word string of the second text obtained by rewriting $X^i$, wherein a language of the first text is same as a language of the second text, the model parameters θ include model parameters $\theta_y$, $\theta_x$, $\theta_s$, $\theta_v$, $\theta_p$, $\theta_w$, $\theta_o$, and the model is configured to:

execute conversion based on the model parameter $\sigma_y$ on the sequence $Y^{\wedge 1}, \ldots, Y^{\wedge t-1}$ of the first (n−1) word strings of the second text to obtain a sequence $u^{Y,1}, \ldots, u^{Y,t-1}$ of a text vector $u^{Y,i}$ of a word string $Y^{\wedge i}$ of the second text for i=1, . . . , t−1, execute conversion based on the model parameter $\theta_x$ on the t-th word string $X^t$ of the first text to obtain a text vector $u^{X,t}$ of the t-th word string $X^t$ of the first text, execute conversion based on the model parameter $\theta_y$ on the sequence $u^{Y,1}, \ldots, u^{Y,t-1}$ to obtain a (t−1)-th second text sequence embedded vector $v^{t-1}$, execute conversion based on the model parameter $\theta_s$ on a word string $y_1^t, \ldots, y_{n-1}^t$ previous to an n-th word $y_n^t$ included in a t-th word string $Y^{\wedge t}$ of the second text and the text vector $u^{X,t}$ to obtain a context vector $s_n^t$ for an n-th word of the t-th word string $Y^{\wedge t}$ of the second text taking into account the first text, where n is a positive integer equal to or less than a number of words included in the t-th word string $Y^{\wedge t}$ of the second text, execute conversion based on the model parameter $\theta_p$ on the second text sequence embedded vector $v^{t-1}$ and the context vector $s_n^t$ to obtain a copy probability $p_n^t$ for an n-th word of the t-th word string $Y^{\wedge t}$ of the second text where the copy probability $p_n^t$ represents a probability of copying a word from the t-th word string $X^t$, thereby deleting, based on the pobability $p_n^t$, operations of copying the word from the t-th word string $X^t$, on the basis of the model parameters θ, execute conversion based on the model parameter $\theta_w$ on the second text sequence embedded vector $v^{t-1}$ and the context vector $s_n^t$ to obtain a posterior probability $P(y_n^t)$ for the n-th word $y_n^t$, and execute conversion based on the model parameter $\theta_o$ on the t-th word string $X^t$ of the first text, the posterior probability $P(y_n^t)$, and the copy probability $p_n^t$ to obtain a posterior probability $P(y_n^t|y_1^t, \ldots, y_{n-1}^t, Y^{\wedge 1}, \ldots, Y^{\wedge t-1}, X^t, \theta)$ corresponding to a posterior probability $P(Y^t|Y^{\wedge 1}, \ldots, Y^{\wedge t-1}, X^t, \theta)$ of the t-th word string $Y^t$ of the second text given the t-th word string $X^t$ of the first text, the sequence $Y^{\wedge 1}, \ldots, Y^{\wedge t-1}$ of the word strings of the second text, and the model parameters θ.

9. A machine learning device, comprising processing circuitry configured to execute machine learning with training data being a sequence of couples of a word string $A^i$ of a second text and a word string $B^i$ of a first text to obtain one or more model parameters θ of a model that estimates information corresponding to a t-th word string $Y^t$ of the second text, which is a conversion result of a t-th word string $X^t$ of the first text, on the basis of the model parameter θ, by using, as inputs, a t-th word string $X^t$ of the first text and a sequence $Y^{\wedge 1}, \ldots, Y^{\wedge t-1}$ of first to (t−1)-th word strings of the second text, which is a conversion result of a sequence $X^1, \ldots X^{t-1}$ of first to (t−1)-th word strings of the first text, where t is an integer of 2 or greater, $X^i$ is a word string of the first text, and $Y^i$ is a word string of the second text obtained by rewriting $X^i$, wherein a language of the first text is same as a language of the second text, the model parameters θ include model parameters $\theta_y$, $\theta_x$, $\theta_s$, $\theta_v$, $\theta_q$, $\theta_d$, $\theta_m$, $\theta_a$, and the model is configured to:

execute conversion based on the model parameter $\theta_y$ on a sequence $Y^{\wedge 1}, \ldots, Y^{\wedge t-1}$ of the word strings of the second text to obtain a sequence $u^{Y,1}, \ldots, u^{Y,t-1}$ of a text vector $u^{Y,i}$ of a word string $Y^{\wedge i}$ of the second text for i=1, . . . , t−1, execute conversion based on the model parameter $\theta_x$ on the t-th word string $X^t$ of the first text to obtain a text vector $u^{X,t}$ of the t-th word string $X^t$ of the first text, execute conversion based on the model parameter $\theta_v$ on a sequence $u^{Y,1}, \ldots, u^{Y,t-2}$ to obtain a (t−2)-th second text sequence embedded vector $v^{t-2}$, execute conversion based on the model parameter $\theta_s$ on a word string $y_1^t, \ldots, y_{n-1}^t$ previous to an n-th word $y_n^t$ included in a t-th word string $Y^{\wedge t}$ of the second text and the text vector $u^{X,\,t}$ to obtain a context vector $s_n^t$ for an n-th word of the t-th word string $Y^{\wedge t}$ of the second text taking into account the first text, where n is a positive integer equal to or less than a number of words included in the t-th word string $Y^{\wedge t}$ of the second text, execute conversion based on the model parameter $\theta_q$ on the word string $y_1^t, \ldots, y_{n-1}^t$, the second text sequence embedded vector $v^{t-2}$, and the sequence $u^{Y,\,t-1}$ to obtain a context vector $g_n^t$ for an n-th word of the t-th word string $Y^{\wedge t}$ of the second text taking into account previous word string of the second text, execute conversion based on the model parameter $\theta_m$ on the context vector $s_n^t$, a (t−1)-th word string $Y^{\wedge t-1}$ of the second text, and the context vector $g_n^t$ for the n-th word of the t-th word string $Y^{\wedge t}$ of the second text to obtain a copy probability $M_n^t$ for the n-th word of the t-th word string $Y^{\wedge t}$ of the second text where the copy probability $M_n^t$ represents a probability of copying a word from the t-th word string $X^t$ or the sequence $Y^{\wedge 1}, \ldots, Y^{\wedge t-1}$, thereby deleting, based on the probability $M_n^t$, operations of copying the word from the t-th word string $X^t$ or the sequence $Y^{\wedge 1} \ldots, Y^{\wedge t-1}$, on the basis of the model parameters $\theta$, execute conversion based on the model parameter $\theta_d$ on the context vector $s_n^t$ and the context vector $q_n^t$ for the n-th word of the t-th word string $Y^{\wedge t}$ of the second text to obtain a posterior probability $P(y_n^t)$ for the n-th word $y_n^t$, and execute conversion based on the model parameter $\theta_a$ on the t-th word string $X^t$ of the first text, the (t−1)-th word string $Y^{\wedge t-1}$ of the second text, the posterior probability $P(y_n^t)$, and the copy probability $M_n^t$ to obtain a posterior probability $P(y_n^t|y_1^t, \ldots, y_{n-1}^t, Y^{\wedge 1}, \ldots, Y^{\wedge t-1}, X^t, \theta)$ corresponding to a posterior probability $P(Y^t|Y^{\wedge 1}, \ldots, Y^{\wedge t-1}, X^t, \theta)$ of the t-th word string $Y^t$ of the second text given the t-th word string $X^t$ of the first text, the sequence $Y^{\wedge 1}, \ldots, Y^{\wedge t-1}$ of the word strings of the second text, and the model parameters $\theta$.

10. A non-transitory computer-readable recording medium storing a program for causing a computer to operate as the machine learning device according to claim 9.

11. A sequence conversion method, comprising:

estimating information corresponding to a t-th word string $Y^t$ of a second text, which is a conversion result of a t-th word string $X^t$ of a first text, on the basis of one or more model parameters $\theta$ by using, as inputs, the t-th word string $X^t$ of the first text and a sequence $Y^{\wedge 1}, \ldots, Y^{\wedge t-1}$ of first to (t−1)-th word strings of the second text, which is a conversion result of a sequence $X^1, \ldots X^{t-1}$ of first to (t−1)-th word strings of the first text, where t is an integer of 2 or greater, wherein the model parameters $\theta$ are obtained by machine learning of a model estimating the information corresponding to the t-th word string $Y^t$, using training data which is a set of multiple couples of a sequence of word strings of the first text and a sequence of word strings of the second text, a language of the first text is same as a language of the second text, the model parameters $\theta$ include model parameters $\theta_y$, $\theta_x$, $\theta_s$, $\theta_v$, $\theta_q$, $\theta_d$, $\theta_m$, $\theta_a$, and the sequence conversion method comprises:

executing conversion based on the model parameter $\theta_y$ on a sequence $Y^{\wedge 1}, \ldots, Y^{\wedge t-1}$ of the word strings of the second text to obtain a sequence $u^{Y,\,1}, \ldots, u^{Y,\,t-1}$ of a text vector $u^{Y,\,i}$ of a word string $Y^{\wedge i}$ of the second text for i=1, ..., t−1, executing conversion based on the model parameter $\theta_x$ on the t-th word string $X^t$ of the first text to obtain a text vector $u^{X,\,t}$ of the t-th word string $X^t$ of the first text, executing conversion based on the model parameter $\theta_v$ on a sequence $u^{Y,\,1}, \ldots, u^{Y,\,t-2}$ to obtain a (t−2)-th second text sequence embedded vector $v^{t-2}$, executing conversion based on the model parameter $\theta_s$ on a word string $y_1^t, \ldots, y_{n-1}^t$ previous to an n-th word $y_n^t$ included in a t-th word string $Y^{\wedge t}$ of the second text and the text vector $u^{X,\,t}$ to obtain a context vector $s_n^t$ for an n-th word of the t-th word string $Y^{\wedge t}$ of the second text taking into account the first text, where n is a positive integer equal to or less than a number of words included in the t-th word string $Y^{\wedge t}$ of the second text, executing conversion based on the model parameter $\theta_q$ on the word string $y_1^t, \ldots, y_{n-1}^t$, the second text sequence embedded vector $v^{t-2}$, and the sequence $u^{Y,\,t-1}$ to obtain a context vector $g_n^t$ for an n-th word of the t-th word string $Y^{\wedge t}$ of the second text taking into account previous word string of the second text, executing conversion based on the model parameter $\theta_m$ on the context vector $s_n^t$, a (t−1)-th word string $Y^{\wedge t-1}$ of the second text, and the context vector $q_n^t$ for the n-th word of the t-th word string $Y^{\wedge t}$ of the second text to obtain a copy probability $M_n^t$ for the n-th word of the t-th word string $Y^{\wedge t}$ of the second text where the copy probability $M_n^t$ represents a probability of copying a word from the t-th word string $X^t$ or the sequence $Y^{\wedge 1}, \ldots, Y^{\wedge t-1}$, thereby deleting, based on the probability $M_n^t$, operations of copying the word from the t-th word string $X^t$ or the sequence $Y^{\wedge 1}, \ldots, Y^{\wedge t-1}$, on the basis of the model parameters $\theta$, executing conversion based on the model parameter $\theta_d$ on the context vector $s_n^t$ and the context vector $q_n^t$ for the n-th word of the t-th word string $Y^{\wedge t}$ of the second text to obtain a posterior probability $P(y_n^t)$ for the n-th word $y_n^t$, and executing conversion based on the model parameter $\theta_a$ on the t-th word string $X^t$ of the first text, the (t−1)-th word string $Y^{\wedge t-1}$ of the second text, the posterior probability $P(y_n^t)$, and the copy probability $M_n^t$ to obtain a posterior probability $P(y_n^t|y_1^t, \ldots, y_{n-1}^t, Y^{\wedge 1}, \ldots, Y^{\wedge t-1}, X^t, \theta)$ corresponding to a posterior probability $P(Y^t|Y^{\wedge 1}, \ldots, Y^{\wedge t-1}, X^t, \theta)$ of the t-th word string $Y^t$ of the second text given the t-th word string $X^t$ of the first text, the sequence $Y^{\wedge 1}, \ldots, Y^{\wedge t-1}$ of the word strings of the second text, and the model parameters $\theta$.

12. A machine learning method, comprising:

executing machine learning with training data being a sequence of couples of a word string $A^i$ of a second text and a word string $B^i$ of a first text to obtain one or more model parameters $\theta$ of a model that estimates information corresponding to a t-th word string $Y^t$ of the second text, which is a conversion result of a word string $X^t$ of the t-th first text, on the basis of the model parameters $\theta$, by using, as inputs, a t-th word string $X^t$ of the first text and a sequence $Y^{\wedge 1}, \ldots, Y^{\wedge t-1}$ of first to (t−1)-th word strings of the second text, which is a conversion result of a sequence $X^1, \ldots X^{t-1}$ of first to (t−1)-th word strings of the first text, where t is an integer of 2 or greater, $X^i$ is a word string of the first text, and $Y^i$ is a word string of the second text obtained by rewriting $X^i$, wherein a language of the first text is same as a language of the second text, the model parameters θ include model parameters $\theta_y$, $\theta_x$, $\theta_s$, $\theta_v$, $\theta_q$, $\theta_d$, $\theta_m$, $\theta_a$, and the model is configured to:

execute conversion based on the model parameter $\theta_y$ on a sequence $Y^{\wedge 1}, \ldots, Y^{\wedge t-1}$ of the word strings of the second text to obtain a sequence $u^{Y, 1}, \ldots, u^{Y, t-1}$ of a text vector $u^{Y, i}$ of a word string $Y^{\wedge i}$ of the second text for i=1, ..., t−1, execute conversion based on the model parameter $\theta_x$ on the t-th word string $X^t$ of the first text to obtain a text vector $u^{X, t}$ of the t-th word string $X^t$ of the first text, execute conversion based on the model parameter $\theta_v$ on a sequence $u^{Y, 1}, \ldots, u^{Y, t-2}$ to obtain a (t−2)-th second text sequence embedded vector $v^{t-2}$, execute conversion based on the model parameter $\theta_s$ on a word string $y_i^t, \ldots, y_{n-1}^t$ previous to an n-th word $y_n^t$ included in a t-th word string $Y^{\wedge t}$ of the second text and the text vector $u^{X, t}$ to obtain a context vector $s_n^t$ for an n-th word of the t-th word string $Y^{\wedge t}$ of the second text taking into account the first text, where n is a positive integer equal to or less than a number of words included in the t-th word string $Y^{\wedge t}$ of the second text, execute conversion based on the model parameter $\theta_q$ on the word string $y_1^t, \ldots, y_{n-1}^t$, the second text sequence embedded vector $v^{t-2}$, and the sequence $ju^{Y, t-1}$ to obtain a context vector $g_n^t$ for an n-th word of the t-th word string $Y^{\wedge t}$ of the second text taking into account previous word string of the second text, execute conversion based on the model parameter $\theta_m$ on the context vector $s_n^t$, a (t−1)-th word string $Y^{\wedge t-1}$ of the second text, and the context vector $g_n^t$ for the n-th word of the t-th word string $Y^{\wedge t}$ of the second text to obtain a copy probability $M_n^t$ for the n-th word of the t-th word string $Y^{\wedge t}$ of the second text where the copy probability $M_n^t$ represents a probability of copying a word from the t-th word string $X^t$ or the sequence $Y^{\wedge 1}, \ldots, Y^{\wedge t-1}$, thereby deleting, based on the probability $M_n^t$, operations of copying the word from the t-th word string $X^t$ or the sequence $Y^{\wedge 1}, \ldots, Y^{\wedge t-1}$, on the basis of the model parameters θ, execute conversion based on the model parameter $\theta_d$ on the context vector $s_n^t$ and the context vector $q_n^t$ for the n-th word of the t-th word string $Y^{\wedge t}$ of the second text to obtain a posterior probability $P(y_n^t)$ for the n-th word $y_n^t$, and execute conversion based on the model parameter $\theta_a$ on the t-th word string $X^t$ of the first text, the (t−1)-th word string $Y^{\wedge t-1}$ of the second text, the posterior probability $P(y_n^t)$, and the copy probability $M_n^t$ to obtain a posterior probability $P(y_n^t|y_1^t, \ldots, y_{n-1}^t, Y^{\wedge 1}, \ldots, Y^{\wedge t-1}, X^t, \theta)$ corresponding to a posterior probability $P(Y^t|Y^{\wedge 1}, \ldots, Y^{\wedge t-1}, X^t, \theta)$ of the t-th word string $Y^t$ of the second text given the t-th word string $X^t$ of the first text, the sequence $Y^{\wedge 1}, \ldots, Y^{\wedge t-1}$ of the word strings of the second text, and the model parameters θ.

\* \* \* \* \*